United States Patent
Flores et al.

(10) Patent No.: US 12,014,380 B2
(45) Date of Patent: Jun. 18, 2024

(54) CUSTOMIZED ITEM SELF-RETURNS SYSTEM

(71) Applicant: Walmart Apollo, LLC, Bentonville, AR (US)

(72) Inventors: Brandon Flores, Mountain View, CA (US); Leslie Irvin, Gravette, AR (US); Douglas E. Humphrys, Bentonville, AR (US); Ryan Crozier, Bentonville, AR (US); Daniel Eckert, Rogers, AR (US); Mark Matthews, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 185 days.

(21) Appl. No.: 17/573,482

(22) Filed: Jan. 11, 2022

(65) Prior Publication Data

US 2022/0138762 A1 May 5, 2022

Related U.S. Application Data

(63) Continuation of application No. 16/269,564, filed on Feb. 7, 2019, now abandoned.

(Continued)

(51) Int. Cl.
*G06Q 30/016* (2023.01)
*G06Q 20/40* (2012.01)
*G06Q 30/02* (2023.01)

(52) U.S. Cl.
CPC ....... *G06Q 30/016* (2013.01); *G06Q 20/4016* (2013.01); *G06Q 30/0281* (2013.01)

(58) Field of Classification Search
CPC ............. G06Q 30/016; G06Q 20/4016; G06Q 30/0281; G06Q 20/407
See application file for complete search history.

(56) References Cited

U.S. PATENT DOCUMENTS 6,018,397 A   1/2000   Cloutier
6,439,345 B1  8/2002   Recktenwald
(Continued)

FOREIGN PATENT DOCUMENTS

CN    103384889 A  * 11/2013 ......... G06K 7/10366
WO    2019067965      4/2019

OTHER PUBLICATIONS

Yao, "Beyond geofencing: specifying location in location based reminder applications" (Year: 2015).*

(Continued)

*Primary Examiner* — Sangeeta Bahl
(74) *Attorney, Agent, or Firm* — Fitch, Even, Tabin & Flannery LLP

(57) ABSTRACT

Examples provide customized authorization of item self-returns. A customized returns manager component calculates a customized return-trust score and a per-item return value based on analysis of item data and transaction history data. If a per-user return-trust score is within an unacceptable threshold range or an item value is within an unacceptable threshold value range, a second user is assigned to assist a first user with completion of the proposed return of the selected item. If the per-user return-trust score and the item value is within an acceptable threshold range, a return authorization component authorizes unassisted self-return of the selected item. An item disposition component determines in real-time whether to permit the first user to keep the selected item or instruct the first user to return the selected item to a designated item return area prior to completion of the item return based on a set of item disposition criteria.

20 Claims, 24 Drawing Sheets

Related U.S. Application Data

(60) Provisional application No. 62/627,883, filed on Feb. 8, 2018.

(56) References Cited

U.S. PATENT DOCUMENTS

| | | | |
|---|---|---|---|
| 6,601,759 | B2 | 8/2003 | Fife |
| 6,606,411 | B1 | 8/2003 | Loui |
| 6,745,186 | B1 | 6/2004 | Testa |
| 6,810,149 | B1 | 10/2004 | Squilla |
| 6,886,101 | B2 | 4/2005 | Glazer |
| 6,937,989 | B2 | 8/2005 | McIntyre |
| 7,177,820 | B2 | 2/2007 | McIntyre |
| 7,222,363 | B2 | 5/2007 | Rice |
| 7,376,572 | B2 | 5/2008 | Siegel |
| 7,431,208 | B2 | 10/2008 | Feldman |
| 7,587,756 | B2 | 9/2009 | Peart |
| 7,716,064 | B2 | 5/2010 | McIntyre |
| 7,716,091 | B2 | 5/2010 | Ross |
| 7,848,765 | B2* | 12/2010 | Phillips ............... G08B 21/0272 455/414.1 |
| 7,930,223 | B2 | 4/2011 | Wang |
| 8,069,092 | B2 | 11/2011 | Bryant |
| 8,082,183 | B2 | 12/2011 | Chowdhary |
| 8,156,007 | B1* | 4/2012 | Anthony ................ G06Q 99/00 705/26.1 |
| 8,311,895 | B1* | 11/2012 | Murugan ............... G06Q 10/08 705/26.1 |
| 8,380,584 | B2 | 2/2013 | Siegel |
| 8,572,712 | B2 | 10/2013 | Rice |
| 8,676,653 | B2 | 3/2014 | Argue |
| 8,814,039 | B2 | 8/2014 | Bishop |
| 8,820,633 | B2 | 9/2014 | Bishop |
| 8,851,369 | B2 | 10/2014 | Biship |
| 9,015,070 | B2 | 4/2015 | Grigg |
| 9,292,824 | B1 | 3/2016 | Freeman |
| 9,652,732 | B1 | 5/2017 | Barstad |
| 9,692,738 | B1* | 6/2017 | Wenneman .......... G06Q 30/016 |
| 10,002,341 | B2 | 6/2018 | Schenken |
| 10,268,984 | B1 | 4/2019 | Ramoji |
| 10,430,753 | B2 | 10/2019 | Felix |
| 10,497,000 | B1* | 12/2019 | Barstad ................ G06Q 20/407 |
| 10,990,981 | B2 | 4/2021 | Nelms |
| 11,120,451 | B2 | 9/2021 | Nelms |
| 11,170,384 | B2* | 11/2021 | Yeung .................... G07G 1/009 |
| 2001/0037207 | A1* | 11/2001 | Dejaeger ................ G06Q 30/06 705/304 |
| 2002/0019785 | A1 | 2/2002 | Whitman |
| 2003/0102373 | A1 | 6/2003 | Swartz |
| 2003/0225625 | A1 | 12/2003 | Chew |
| 2003/0233246 | A1 | 12/2003 | Snapp |
| 2005/0137901 | A1 | 6/2005 | Siegel |
| 2006/0149577 | A1 | 7/2006 | Stashluk, Jr. |
| 2009/0012704 | A1 | 1/2009 | Franco |
| 2009/0125442 | A1 | 5/2009 | Otto |
| 2009/0271265 | A1 | 10/2009 | Lay |
| 2011/0295722 | A1 | 12/2011 | Reisman |
| 2013/0085889 | A1 | 4/2013 | Fitting |
| 2014/0006224 | A1 | 1/2014 | Grigg |
| 2014/0114803 | A1 | 4/2014 | Sundaresan |
| 2014/0172697 | A1 | 6/2014 | Ward |
| 2014/0257927 | A1 | 9/2014 | Brock |
| 2014/0316919 | A1* | 10/2014 | Li ............................ G07G 1/14 705/16 |
| 2015/0066752 | A1 | 3/2015 | Phillips |
| 2015/0186841 | A1 | 7/2015 | Sar |
| 2015/0254666 | A1 | 9/2015 | Agasti |
| 2016/0007151 | A1* | 1/2016 | Birch .................... H04W 4/021 455/456.3 |
| 2016/0042351 | A1 | 2/2016 | Syed |
| 2016/0132891 | A1 | 5/2016 | MacKinnon Keith |
| 2016/0132893 | A1 | 5/2016 | Bisges |
| 2016/0148209 | A1 | 5/2016 | Hammond |
| 2016/0350757 | A1 | 12/2016 | Bolling |
| 2017/0024806 | A1 | 1/2017 | High |
| 2017/0039572 | A1* | 2/2017 | Hammond ........... G06Q 20/202 |
| 2017/0221030 | A1 | 8/2017 | Clark |
| 2017/0293916 | A1 | 10/2017 | Humphrys |
| 2018/0114228 | A1 | 4/2018 | Singh |
| 2018/0165699 | A1* | 6/2018 | Whiffen ............. G06Q 30/0224 |
| 2018/0225623 | A1 | 8/2018 | Mosier |
| 2018/0349846 | A1 | 12/2018 | Sever |
| 2019/0108525 | A1 | 4/2019 | Nelms |
| 2019/0147444 | A1 | 5/2019 | Nelms |
| 2019/0172104 | A1 | 6/2019 | Deluca |
| 2019/0244214 | A1 | 8/2019 | Flores |

OTHER PUBLICATIONS

U.S. Appl. No. 16/269,564 EIC 3600 Search Report Jun. 10, 2021 (Year: 2021).

U.S. Appl. No. 16/269,564 EIC 3600 Search Report Oct. 4, 2021 (Year: 2021).

Aron Hsiao, "How to handle eBay Return and Refund Requests", the balance, https://www.thebalance.com/dealing-with-buyers-refund-requests-1140367, captured, Sep. 26, 2017, 5 pages.

Copenheaver, Blaine R., "International Search Report", International Application No. PCT/US2019/016936, dated Apr. 12, 2019, 2 pages.

Copenheaver, Blaine R., "Written Opinion of the International Searching Authority", International Application No. PCT/US2019/016936, dated Apr. 12, 2019, 9 pages.

Ernest Hooper, Does Publix Throw away returned food and water? Maybe donate unused hurricane supplies instead, Tampa Bay Times, Sep. 12, 2017, https://www.tampabay.com/news/business/retail/does-publix-throw-away-returned-food-and-water-maybe-donate-unused/2337177/. (Year: 2017).

George Sandeman, "This secret Amazon refund loophole allows you to get your money back on purchases without having to return a thing", The Sun, https://www.thesun.co.uk/money/3557377/this-secret-amazon-refund-toophole-allows-you-to-get-your-money-back-on-purchases-without-having-to-ret . . . , capture Sep. 26, 2017, 3 pages.

International Search Report and Written Opinion dated Nov. 26, 2018, issued in corresponding PCT Application No. PCT/US2018/053524.

Neil Nisperos, How to return a holiday gift bought online, Dec. 25, 2016, Invalid Valley Daily Bulletin, Ontario, California; Los Angeles Newspaper Group. 3 pages / Dec. 25, 2016. (Year: 2016).

Non-Final Office Action dated Jun. 11, 2019, issued in co-pending U.S. Appl. No. 16/145,893.

U.S. Appl. No. 16/145,893; Notice of Allowance dated Jan. 8, 2021.

U.S. Appl. No. 16/145,893; Office Action dated Jul. 30, 2020.

U.S. Appl. No. 16/145,893; Office Action dated Nov. 4, 2019.

U.S. Appl. No. 16/248,058; Office Action dated Jan. 26, 2021.

U.S. Appl. No. 16/248,058; Office Action dated Jul. 31, 2020.

U.S. Appl. No. 16/269,564; Notice of Allowance dated Oct. 14, 2021 (pp. 1-11).

U.S. Appl. No. 16/269,564; Office Action dated Jun. 23, 2021.

\* cited by examiner

CUSTOMIZED ITEM SELF-RETURNS SYSTEM

CROSS-REFERENCE TO RELATED APPLICATIONS

This application is a continuation of U.S. application Ser. No. 16/269,564 filed Feb. 7, 2019, which claims the benefit of U.S. Provisional Application No. 62/627,883 filed Feb. 8, 2018, all of which are incorporated herein by reference in their entirety.

BACKGROUND

Typically, when a user wants to return an item to a store, the user brings the item to be returned with a receipt for the item back to the store where the item was originally obtained. The user waits in line at a return desk where a customer service associate scans the receipt, inspects the item to be returned and determines whether to approve the return. If the item return is approved, the amount the user paid for the item may be refunded, in whole or in part, to the user in cash, credit back, a gift card or replacement item. If the item was ordered via an online source, the user may have to repackage and mail the item to a returns location. In such cases, the user may have to wait until the item is received back at the returns location before a refund will be provided to the user. These manual item returns are frequently slow, time-consuming, confusing, and unduly burdensome to users.

SUMMARY

Some examples of the disclosure provide a system for customized item returns. The system includes a memory and at least one processor communicatively coupled to the memory. A calculation component analyzes item data associated with the selected item and transaction history data associated with the first user using a set of score generation rules. The calculation component calculates a return-trust score for a user attempting to return a selected item based on results of the analysis. A return authorization component analyzes the per-user trust score and the item data, including a value of the selected item and a per-item return value, using a set of authorization criteria. The return authorization component determines whether to authorize unassisted self-return of the selected item by the selected user based on results of the analysis. An item disposition component generates a set of item disposition instructions associated with the selected item in real-time based on a set of item disposition criteria and a set of item return data associated with the unassisted self-return of the selected item if the return authorization component authorizes the unassisted self-return of the selected item. The item return data includes a set of item attributes associated with the selected item. A user interface component outputs the set of item disposition instructions to a user device associated with the selected user. The set of item disposition instructions include at least one of a first instruction to return the selected item to a designated return location or a second instruction to retain the selected item by the selected user.

Other examples provide a computer-implemented method for customized item returns. A returns management component receives item return data associated with a proposed return of a selected item from a user device associated with a first user. The item return data includes an identification of the first user, item data associated with the selected item, and a user-provided reason for proposed return of the selected item. A task assignment component assigns a second user to assist the first user with completion of the proposed return of the selected item on condition a per-user return-trust score associated with the user is within an unacceptable return-trust score threshold range or a per-item return value associated with the selected item is within an unacceptable return value threshold range. A return authorization component authorizes unassisted self-return of the selected item by the first user on condition the per-user return-trust score associated with the selected user is within an acceptable return-trust score threshold range and the per-item return value associated with the selected item is within an acceptable return value threshold range. An item disposition component selects a disposition of the selected item on condition the unassisted self-return of the selected item by the first user is authorized based on an analysis of the item return data, transaction history data associated with the first user, and item data using a set of item disposition criteria, the disposition of the selected item comprising returning the selected item to a designated return location or retaining the selected item by the selected user. The returns management component approves completion of proposed return without return of the selected item to the designated return location on condition the selected disposition comprises retaining the selected item by the selected user. A notification component outputs a disposition notification to the selected user instructing the selected user to place the selected item in a designated receptacle associated with the designated return location via a user interface component associated with the user device on condition the selected disposition comprises returning the selected item.

Still other examples provide a system for score-based item returns authorization. The system includes a memory; at least one processor communicatively coupled to the memory; and a data storage device comprising transaction history data for an identified user and a set of item disposition rules associated with a plurality of items. A calculation component calculates a return-trust score for the identified user attempting to return a set of items from the plurality of items based on an analysis of item data associated with the set of items, user-provided item return data, and transaction history data associated with the identified user. A task assignment component assigns a second user to assist the identified user with completion of the proposed return of the set of items on condition the return-trust score is within an unacceptable return-trust score threshold range or a per-item return value associated with the set of items is within an unacceptable return value threshold range. A return authorization component authorizes unassisted self-return of the set of items if the return-trust score associated with the selected user is within an acceptable return-trust score threshold range and the per-item return value is within an acceptable return value threshold range. An item disposition component generates a set of item disposition instructions associated with the selected item in real-time based on a set of item disposition criteria and a set of item return data associated with the unassisted self-return of the set of items on condition the return authorization component authorizes the unassisted self-return of the selected item. A return management component authorizes completion of the return of the set of items without return of the set of items to a designated item return area on condition an estimated restock cost associated with the set of items is within an unacceptable threshold range. A user interface component outputs the set of item disposition instructions to a user device associated with the identified user. The set of item disposition instructions includes at least one of an instruction to return the selected item to a designated return location on condition the estimated restock cost associated with the set of items is within an acceptable threshold range.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure enable a system for providing self-return of items via a customized returns manager component without user intervention. In some examples, the system generates a return-trust score for an identified user based on user-provided data, the user's transaction history data, including previous purchases and/or previous returns. The return-trust score is customized for each user. The system determines whether to permit a particular user to return an item via an automated system without supervision or assistance of returns personnel based on the return-trust score for that user. This enables the system to quickly and accurately determine whether a user has sufficient experience with item purchases and/or return (s) indicating the user is capable of completing a self-return without assistance. The users history can also indicate whether the user should be trusted to correctly perform a self-return without assistance and/or how many items the user should be trusted to return without assistance.

In other examples, the system provides an item return value indicating appropriateness of unassisted self-return of the item. The system analyzes the item return value for a given item to determine whether to permit a user to return the given item without assistance. This enables quick and efficient self-return authorizations of items.

The system analyzes item return data using a set of disposition criteria to determine disposition of an item approved for self-return by the identified user. The disposition criteria are utilized to identify a most suitable disposition of each item returned by a user via the self-return system on a per-item basis for increased item return efficiency and improved user return system interactions.

Figure 1:
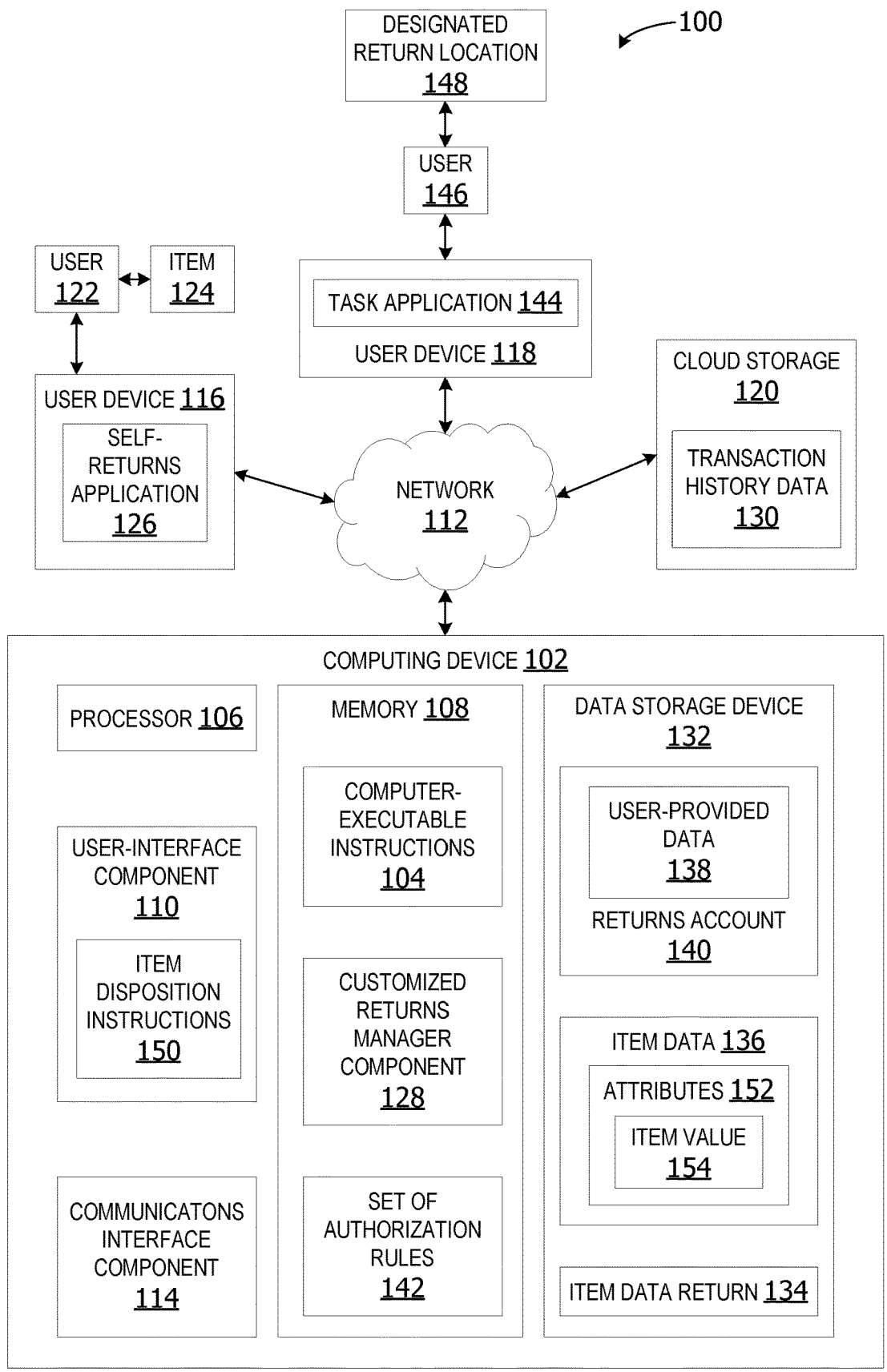
FIG. 1 is an exemplary block diagram illustrating a system for customized self-returns.

Referring again to FIG. 1, an exemplary block diagram illustrates a system 100 for customized self-returns. In the example of FIG. 1, the computing device 102 represents any device executing computer-executable instructions 104 (e.g., as application programs, operating system functionality, or both) to implement the operations and functionality associated with the computing device 102. The computing device 102 can include a mobile computing device or any other portable device. In some examples, the mobile computing device includes a mobile telephone, laptop, tablet, computing pad, netbook, gaming device, and/or portable media player. The computing device 102 can also include less-portable devices such as a server, a desktop personal computer, an item return kiosk, or tabletop devices. Additionally, the computing device 102 can represent a group of processing units or other computing devices.

In some examples, the computing device 102 has at least one processor 106 and a memory 108. The computing device 102 can also include a user interface component 110.

The processor 106 includes any quantity of processing units and is programmed to execute the computer-executable instructions 104. The computer-executable instructions 104 can be performed by the processor 106 or by multiple processors within the computing device 102 or performed by a processor external to the computing device 102. In some examples, the processor 106 is programmed to execute instructions such as those illustrated in the figures (e.g., FIG. 10, FIG. 11, FIG. 12, FIG. 13, and FIG. 14).

The computing device 102 further has one or more computer readable media such as the memory 108. The memory 108 includes any quantity of media associated with or accessible by the computing device 102. The memory 108 can be internal to the computing device 102 (as shown in FIG. 1), external to the computing device (not shown), or both (not shown). In some examples, the memory 108 includes read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications can represent downloaded client-side applications that correspond to server-side services executing in a cloud.

In other examples, the user interface component 110 includes a graphics card for displaying data to the user and receiving data from the user. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component 110 can also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. In a non-limiting example, the user inputs commands or manipulate data by moving the computing device 102 in a particular way.

The network 112 is implemented by one or more physical network components, such as, but without limitation, routers, switches, network interface cards (NICs), and other network devices. The network 112 can be any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to a user device 116, a user device 118 and/or a cloud storage 120, can occur using any protocol or mechanism over any wired or wireless connection. In some examples, the communications interface component 114 is operable with short range communication technologies such as by using near-field communication (NFC) tags. The communications interface component 114 in some examples retrieves the transaction history data 130 from a cloud storage 120 via the network 112.

User device 116 and user device 118 represent any type of device executing computer-executable instructions. The user device 116 and/or the user device 118 can be implemented as a mobile computing device, such as, but not limited to, a wearable computing device, a mobile telephone, laptop, tablet, computing pad, netbook, gaming device, and/or any other portable device. The user device 116 and/or the user device 118 includes at least one processor and a memory. The user device 116 and/or the user device 118 can also include a user interface component for providing input to the user device and/or receiving output from the user device.

The user device 116 is a computing device associated with a user 122 attempting to return an item 124 to a provider of the item 124 via a self-returns application 126 executing on the user device 116. The self-returns application 126 can be downloaded from the computing device 102, the cloud storage 120, an applications server, or other application provider via the network 112. The self-returns application 126 in some examples is an application for facilitating an unassisted self-return of the item 124. An unassisted self-return is an automated return system enabling a user to obtain a refund of a purchase price paid for the item 124 without interacting with a returns manager, service representative, or any other personnel associated with the provider of the item 124.

The user initiates the unassisted self-return process via the self-returns application 126 in some examples. In these examples, the user 122 scans a barcode or other marker on the item 124 using a scanning device, image capture device, or other sensor device associated with the user device 116. The self-returns application 126 utilizes the scan data and/or image data to obtain item return data associated with the item. The self-returns application 126 sends the item return data to a customized returns manager component 128. The customized returns manager component 128 provides the unassisted item self-return services to the user 122 on behalf of the provider of the item 124.

The customized returns manager component 128 is stored on the memory and executed by the processor 106 to perform the unassisted item self-returns. In some examples, the customized returns manager component 128 obtains the item return data from the self-returns application 126. The item return data can include an identification of the item 124 offered for return, a time and/or date the item 124 was purchased, an amount paid for the item 124, a reason for return of the item, and/or a transaction identifier, such as a transaction code, receipt number, or other identification associated with the item 124.

The customized returns manager component 128 obtains transaction history data 130 associated with the user 122 in some examples. The transaction history data 130 is data including prior item purchase transactions by the user 122, prior item return transactions by the user 122, number of previous purchases, number of previous returns, etc.

The transaction history data 130 is data generated by one or more point-of-sale (POS) devices. The transaction history data 130 can include data associated with online item purchases, online item returns, in-store item purchases, and/or in-store item returns. The transaction history data 130 can be obtained directly from a plurality of POS devices, obtained from a local data storage device, such as the data storage device 132, and/or obtained from a remote data storage, such as, but not limited to, the cloud storage 120.

The data storage device 132 can include one or more different types of data storage devices, such as, for example, one or more rotating disks drives, one or more solid state drives (SSDs), and/or any other type of data storage device. The data storage device 132 in some non-limiting examples includes a redundant array of independent disks (RAID) array. In other examples, the data storage device 132 includes a database.

The data storage device 132 in this example is included within the computing device 102 or associated with the computing device 102. In other examples, the data storage device 132 includes a remote data storage accessed by the computing device via the network 112, such as a remote data storage device, a data storage in a remote data center, or the cloud storage 120.

The customized returns manager component 128 aggregates the item return data 134, the transaction history data 130, item data 136, and/or user-provided data 138. The item data 136 is data describing the item 124. The item data 136 can include a size of the item, base price of the item 124, actual price paid, type of item (perishable/nonperishable), category of the item 124, supplier, estimated restock price of the item, number of instances of the item returned within a predetermined time-period, and/or any other attributes 152 of the item 124. The item data 136 in this example includes an item value 154. The item value 154 is a calculated value of the item 124.

The item attributes 152 in other examples includes a category of a selected item, a value of the selected item, an item returns history associated with the selected item, a number of instances of the selected item returned within a predetermined time-period, a number of valid returns of instances of the selected item within a predetermined time-period, and/or a number of invalid attempted returns of instances of the selected item within the predetermined time-period.

In one non-limiting example, the item attributes 152 for paper towels includes information such as, a brand "Great Value", a type "sized-4-spills", a number of rolls per package "6 rolls", and item details, such as "double roll paper towels, quilted, white, and 168 sheets.

The item data 136, item return data 134, and/or user-provided data 138 in this example is stored on the local data storage device 132. In other examples, item data 136, item return data 134, and/or user-provided data 138 is stored on a remote data storage, such as the cloud storage 120.

The user-provided data 138 in some non-limiting examples includes data provided by the user 122, such as a user's returns account 140 information, login (username and/or password), user-provided reason for return of the item 124, and/or any other information provided by the user via the self-returns application 126.

The customized returns manager component 128 analyzes the aggregated item return data 134, the transaction history data 130, item data 136, and/or user-provided data 138 using a set of authorization rules 142. The set of authorization rules 142 includes one or more rules for determining whether to authorize the user 122 to receive a refund for return of the item 124 without interacting with some manager or other personnel during the item return transaction.

The set of authorization rules 142 in one example includes a rule such as, but not limited to, a threshold number of item returns in a single transaction. If a user attempts to returns a number of instances of the same item in a single transaction, it can indicate the user requires assistance (providing assistance is advisable). In another example, authorization rules specify a threshold total value of all items being returned in a single transaction. If the total refund amount would exceed the threshold, the unassisted self-return should be unauthorized (assistance required).

The set of authorization rules 142 in another example include a threshold per-user return trust score range and/or a per-item return value threshold range. If the return trust score or the item return value is within an acceptable threshold range, the return transaction is authorized. If either the return trust score or the item return value is outside the acceptable threshold range, the unassisted return is unauthorized (assistance is requested).

If the customized returns manager component 128 fails to authorize (unauthorizes) the unassisted self-return of the item 124 by the user 122 based on the aggregated data and set of authorization rules 142, the If the customized returns manager component 128 sends a task assignment to a task application 144 running on the user device 118 associated with the user 146. In this non-limiting example, the user 146 is some manager or other personnel tasked with assisting users with item return transactions. The task application 144 outputs the task assignment instructing the user 146 to assist the user 122 with the return of the item 124. In some examples, the user 146 assists the user 122 with the item return transaction at a designated return location 148, such as, but not limited to, a customer service area in a store, an item return kiosk in a store, an item return area, or other designated location for processing item return transactions.

If the customized returns manager component 128 authorizes the user to complete the returns transaction associated with the item 124 via an unassisted self-return, the customized returns manager component 128 generates item disposition instructions 150 associated with the selected item 124 in real-time. The item disposition instructions 150 instruct the user 122 in disposition of the item 124 following authorization of the unassisted return of the item 124. The item disposition instructions 150 can instruct the user to retain (keep) the item 124 or leave the item 124 at the designated return location 148. In some examples, the designated return location 148 incudes a bin, slot, box, or other container in which the user 122 deposits or places the item 124 for return.

The user interface component 110 outputs the item disposition instructions 150 to the user device 116 associated with the user 122 in this non-limiting example. The item disposition instructions 150 include an instruction to return the selected item to the designated return location 148, dispose of the item or an instruction to retain the item 124 by the user 122.

Figure 2:
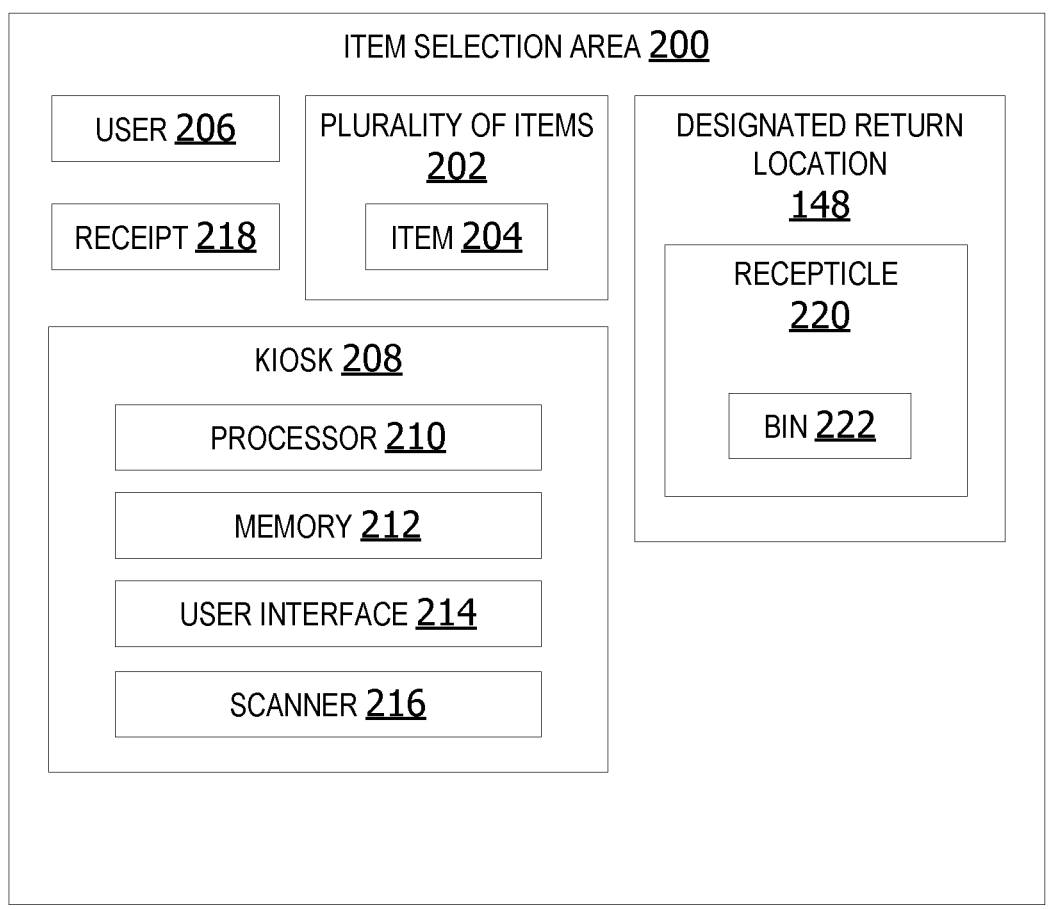
FIG. 2 is an exemplary block diagram illustrating a designated return location associated with an item selection area.

FIG. 2 is an exemplary block diagram illustrating a designated return location associated with an item selection area 200. The item selection area 200 is a location including a plurality of items 202, such as, but not limited to the item 204. The item 204 is an item for proposed return by a user, such as, but not limited to, the item 124 in FIG. 1. The item 204 can be a perishable item, an unperishable item, a sports-related item, a comestible, a cleaning item, a pet supply item, an office supply item, or any other type of item. A user 206 can initiate return of the item 204 via an unassisted self-return using a self-returns application running on a user device, such as, but not limited to the user device 116 in FIG. 1. In other examples, the user 206 initiates the unassisted self-return of the item 204 via a kiosk 208.

The kiosk 208 is a computing device, such as, but not limited to, the computing device 102 in FIG. 1. The kiosk 208 includes a processor 210, a memory 212 storing a customized returns manager component, and/or a user interface 214. The kiosk 208 can also include a scanner 216. The scanner 216 is a scanner device for scanning a universal product code (UPC), a quick response (QR) code, a marker, a matrix barcode, a radio frequency identifier (RFID) tag, or any other identifier associated with the item 204 and/or a receipt 218 associated with the item 204. However, in other examples, the self-return of an item is completed without a receipt.

In one example, the user scans the receipt 218 and/or a marker associated with the item 204 via the scanner 216. The kiosk 208 utilizes the scan data generated by the scanner 216 to generate item return data. The user 206 can optionally utilize the user interface 214 to provide item return information, such as, but not limited to, an identification of the user, a refunds account login, a reason for return of the item 204, and/or any other item return data or user provided data.

The kiosk 208 can be a self-check/self-return kiosk including an authorization component utilizing authorization rules and/or item disposition rules to complete unassisted, self-return of items with fraud avoidance based on the user's past purchase history. The kiosk 208 establishes a return-trust value for the user to determine if the user can complete a return without associate assistance or if assistance is required from returns manager or other personnel to complete the transaction.

If the customized returns manager component approves unassisted return of the item 204, the customized returns manager component outputs item disposition instructions to the user 206 via the user interface 214 in this example. The instructions can include instructions for the user to leave the item 204 in a designated receptacle 220 in a designated return location 148. The receptacle 220 can include one or more containers, such as bin 222.

Upon receipt of the item 204 at the designated return location 148, the customized returns manager component refunds a purchase price of the item 204 in whole or in part to a user account associated with the user 206. In other examples, the customized returns manager component authorizes provision of a refund in the form of cash, credit, a gift card, cryptocurrency, or other type of funds.

In some examples, the designated return location includes a return area with a marker, such as a QR code, displayed at the designated return location 148. The user scans the QR code or other marker using a scanning device on the user's mobile device. When the QR code is scanned, it triggers the self-returns application to push the item return data to the customized returns manager component on a server or other computing device hosting the customized returns manager component. The user scans the item and places the item in the bin or other designated receptacle. This permits the user to quickly and efficiently complete the return transaction at the designated return location.

In some examples, when an item return is complete, the self-returns application outputs a return transaction complete notification indicating the return is complete and a refund is pending or completed.

Figure 3:
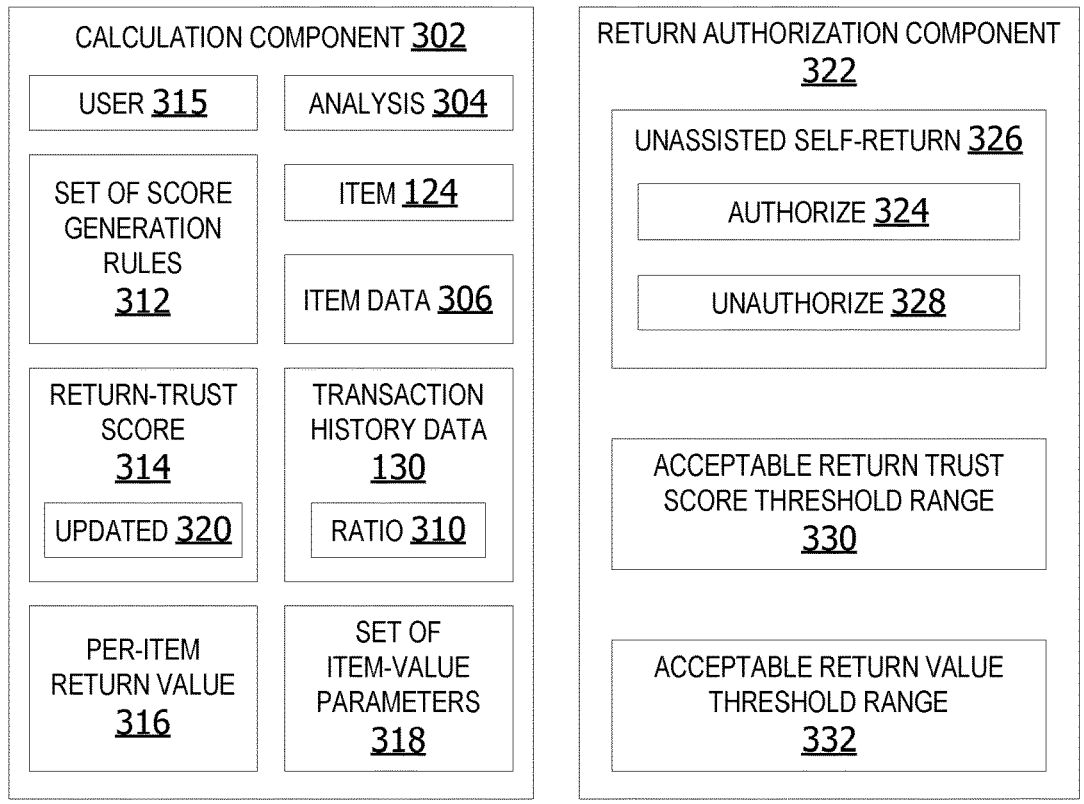
FIG. 3 is an exemplary block diagram illustrating a customized returns manager component for authorizing self-returns of items.
Figure 3:
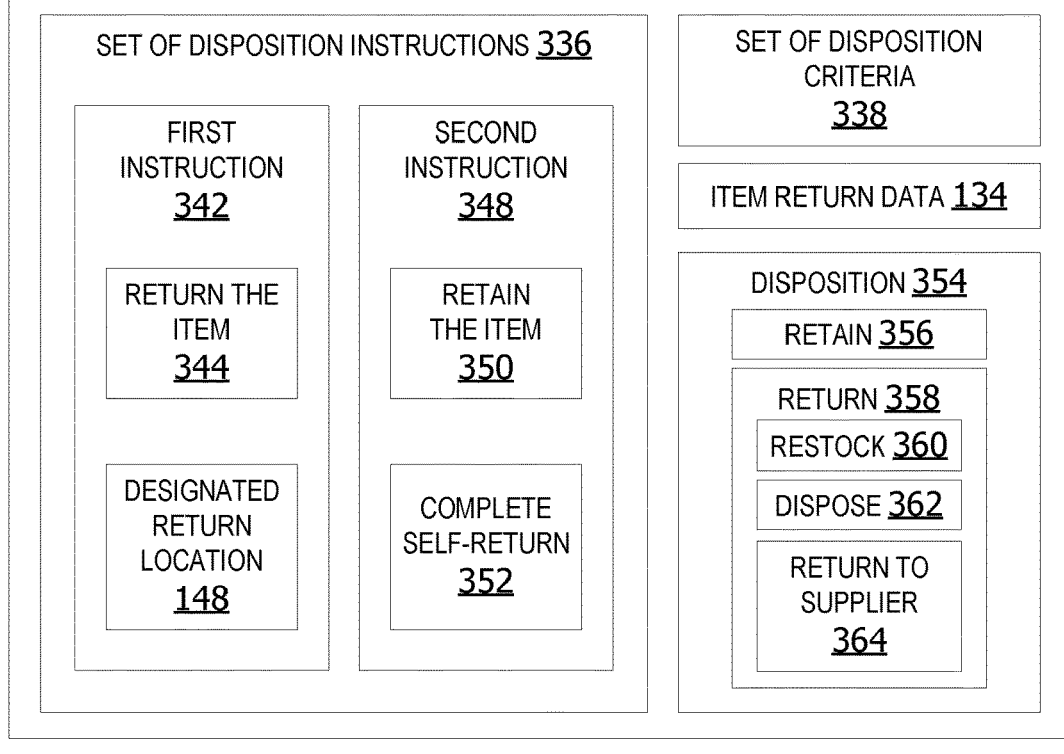

FIG. 3 is an exemplary block diagram illustrating a customized returns manager component 128 for authorizing self-returns of items. A calculation component 302 performs an analysis 304 on item data 306, transaction history data 130, including a ratio 310 of item purchases to item returns using a set of score generation rules 312. The calculation component 302 calculates a per-user return-trust score 314 for a user 315 attempting to return an item 124 based on the results of the analysis 304.

The item data 306 is data describing the item 124 to be returned. The item data 306 can include item attributes, item value, or any other item data, such as, but not limited to, the item data 136 in FIG. 1. The transaction history data 130 is data associated with previous purchases and previous returns by the user 315. The transaction data for each user is unique to that user.

The return-trust score 314 is a score or ranking indicating a degree of trust or item return experience/qualifications for the user 315. If a user has never completed a transaction associated with an item via a self-checkout and/or the user has never returned an item via an unassisted self-return, the return-trust score 314 is lower than the score for a user that has successfully completed many self-checkout transactions and/or unassisted self-return transactions. In another example, if a user has returned many items in the past without difficulty and without any issues arising with regard to the item returns, the return-trust score is higher than a score for a user that has attempted one or more item returns associated with an issue, such as, a missing receipt, a fraudulent return, etc.

The set of score generation rules 312 include one or more rules for generating a return-trust score 314. The set of score generation rules 312 in one non-limiting example, includes a rule for assigning a trust-score of zero to a user that has no history of any previous purchases or previous return transactions. In other words, if there is no transaction history data 130 for a user because the user is unrecognized/un-identified, and/or the user has never purchased any items or returned any items associated with the user's returns account, the return-trust score 314 within an unacceptable threshold range is assigned. This return-trust score indicates that the user may require assistance with the return due to lack of experience/previous history returning items.

In another example, the set of score generation rules 312 includes a rule for generating a score within an acceptable threshold range if the user has successfully returned one or more items with a valid receipt either in person or via an online return process. The set of score generation rules 312 in other examples, includes a rule for lowering the return-trust score to a score within an unacceptable threshold range if the user makes one or more attempts to return an item to a store which is not carried within an inventory of the store.

The calculation component 302 calculates a per-item return value 316 for the item being returned based on an analysis of the item data 306 and a set of item-value parameters 318. The per-item return value 316 indicates a degree of appropriateness of an item for unassisted self-return. The set of item-value parameters 318 includes one or more parameters for determining the item-value for a selected item. Each type of item in a plurality of items carried within an inventory of a store (online or brick-and-mortar) receives a unique return value customized for that type of item. For example, the return value for a gallon of milk would be different than the return value for a laptop computer.

The item value can be represented by any value on any ranking system or scale. For example, item value can be represented by numbers on a scale of one to ten, numbers on a scale of one to one hundred, letters on a scale of A to Z, a combination of letters and numbers, percentages, etc.

The set of item-value parameters 318 in some examples include a rule for assigning a return value to an item based on the sale price of the item. The higher the sale price of the item, the greater the return value assigned to the item. For example, a one-dollar pack of bubble gum can receive a very low item value of 1 while a video game console having a dollar value of four-hundred dollars can receive an item value of one hundred.

In other examples, the set of item-value parameters 318 include a set of predetermined return values to be assigned based on a category of the item. For example, all items in a condiments category can receive a return value of two while all items in an electronics category receives a return value of one hundred, regardless of the individual cost/price of the items in the category. In this example, items having a return value of ten or less can be approved for unassisted self-return and all items having a return value greater than ten are disqualified for unassisted self-return. This ensures that high value items, specialty items, high demand items, or certain categories of items are returned with assistance from some returns manager or other personnel while low value or inconsequential items are automatically approved for unassisted self-return by the user.

In some examples, the user's return-trust score is updated 320 based on current returns transactions in real-time. In these non-limiting examples, each time a user completes a return transaction successfully, the return-trust score 314 is updated 320 to increase the score. Likewise, if the user attempts a return transaction that is rejected or fails to complete due to a problem with the item, receipt of other issue associated with the return, the return-trust is updated to reflect a lower level of returns-related trust for the user.

A return authorization component 322 determines whether to authorize 324 an unassisted self-return 326 of the item 124 by the user 315 based on the per-user return-trust score 314 calculated for the user 315 and the per-item return value 316 associated with the item 124 to be returned. In one example, the return authorization component 322 authorizes the unassisted self-return 326 if the return-trust score 314 is within an acceptable return-trust score threshold range 330 and the per-item return value 316 for the item 124 is within an acceptable return value threshold range 332.

If the return authorization component 322 authorizes the unassisted self-return, an item disposition component 334 generates a set of item disposition instructions 336 associated with the item 124 in real-time based on a set of item disposition criteria 338 and item return data 134 associated with the unassisted self-return 326 of the selected item 124. The item return data 134 in this example, includes item attributes associated with the item 124.

The set of item disposition instructions 336 includes a first instruction 342 directing the user to return the item 344 to a designated return location 148 or a second instruction 348 to retain the item 350 and complete the self-return 352.

The disposition 354 of the item can include permitting the user to retain 356 the item or return the item 358. If the user is allowed to retain the item, the user can complete the unassisted self-return and receive a refund for the item without returning the item to the store of another provider/seller of the item. If the item is returned to the designed item return location, the item can be designated for restock 360, in which the item is restocked if the estimated cost of restock is below a maximum threshold restock cost. The item disposition can be to dispose 362 of the item if it is perishable, damaged, broken, inoperable, or otherwise not fit for re-sale/utilization. The disposition can include return to a supplier 364 if the cost of shipping the item back to the supplier is within an acceptable threshold cost range.

Figure 4:
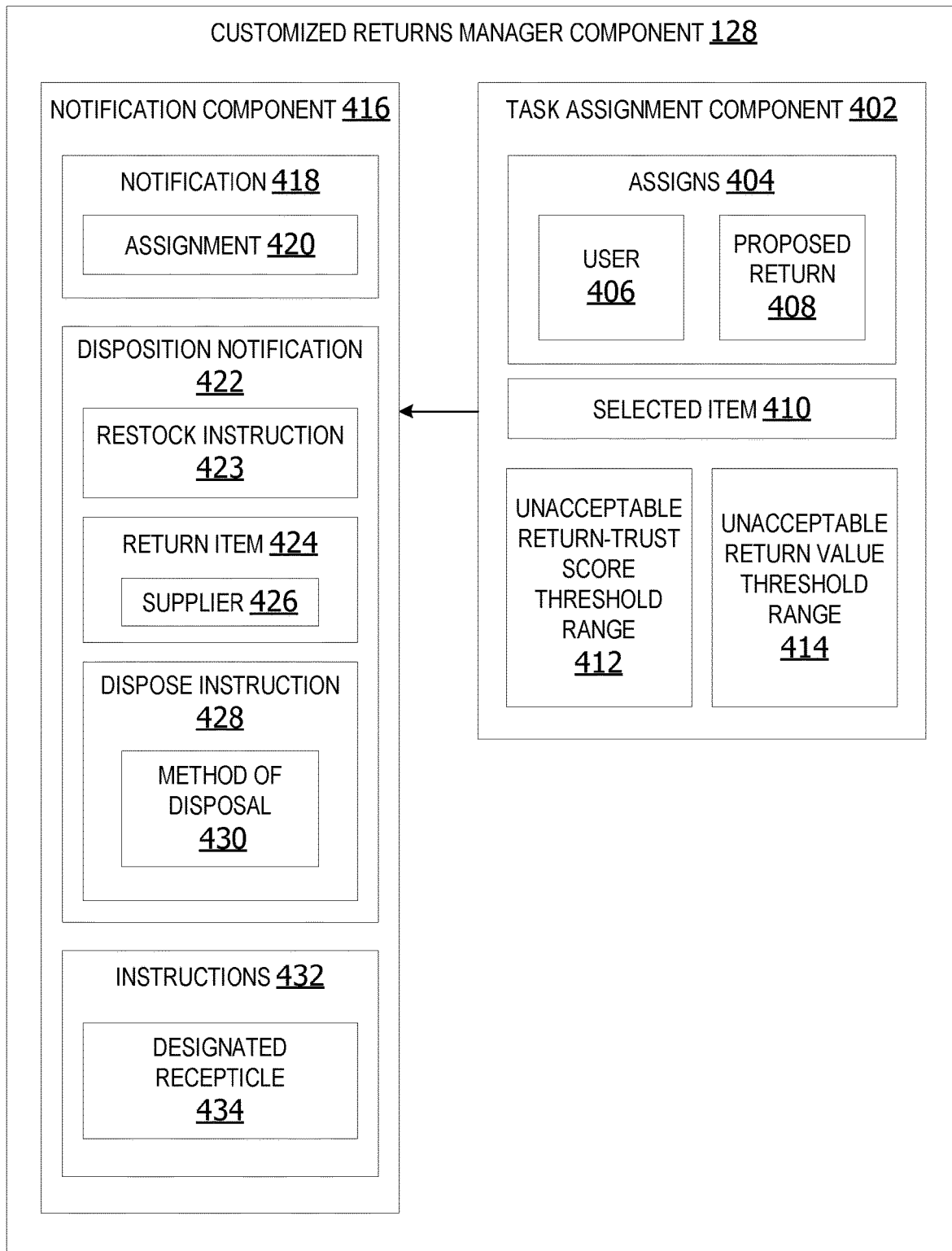
FIG. 4 is an exemplary block diagram illustrating a customized returns manager component for generating item disposition instructions.

FIG. 4 is an exemplary block diagram illustrating a customized returns manager component 128 for generating item disposition instructions. A task assignment component 402 assigns 404 a second user (returns manager) to assist a first user (customer) with completion of the proposed return 408 of a selected item 410 if the per-user return-trust score associated with the user 406 is within an unacceptable return-trust score threshold range 412 or a per-item return value associated with the selected item 410 is within an unacceptable return value threshold range 414. The selected item is any type of item, such as, but not limited to, the item 124 in FIG. 1 and FIG. 3.

A notification component 416 in some examples outputs a notification 418, including an assignment 420, to a user device associated with the second user. The notification 418 assigns the second user to assist the first user with completing a return of the selected item 410 on condition the return authorization component fails to authorize the unassisted self-return of the selected item.

The notification component 416 in other examples outputs a disposition notification 422, including a restock instruction 423, to a user device associated with the second user. The restock instruction 423 instructs the second user to restock the selected item on condition the selected item is returned to the designated return location and an estimated cost of restocking the selected item is below a maximum restocking cost threshold.

The notification component 416 in other examples outputs a disposition notification 422, including a return item 424 instruction, to a user device associated with the second user instructing the second user to return the selected item to a supplier of the item on condition the selected item is designated as an item to be returned to the supplier. The supplier can include a manufacture, distribution center, or other supplier of the item 410.

The notification component 416 in still other examples outputs a disposition notification 422, including a dispose instruction 428, to a user device associated with the second user to dispose of the selected item on condition of return the selected item to the designated return location and the selected item is a perishable item associated with a cold-chain compliance requirement. The dispose instruction 428 can include a method of disposal 430, such as, but not limited to, throwing an item away, donating an item to charity, etc.

The notification component 416 can output instructions 432 for returning an item to a designated item return area prior to completion of a return transaction. The instructions 432 can specify a designated receptacle in a plurality of receptacles for placement of the item. In an example, the item return area includes two or more bins, totes, boxes or other containers for holding returned items. The instructions 432 can include an identification of a specific container the user is to place the returned item. The identification can include a number, name, or other identifier of a container.

Figure 5:
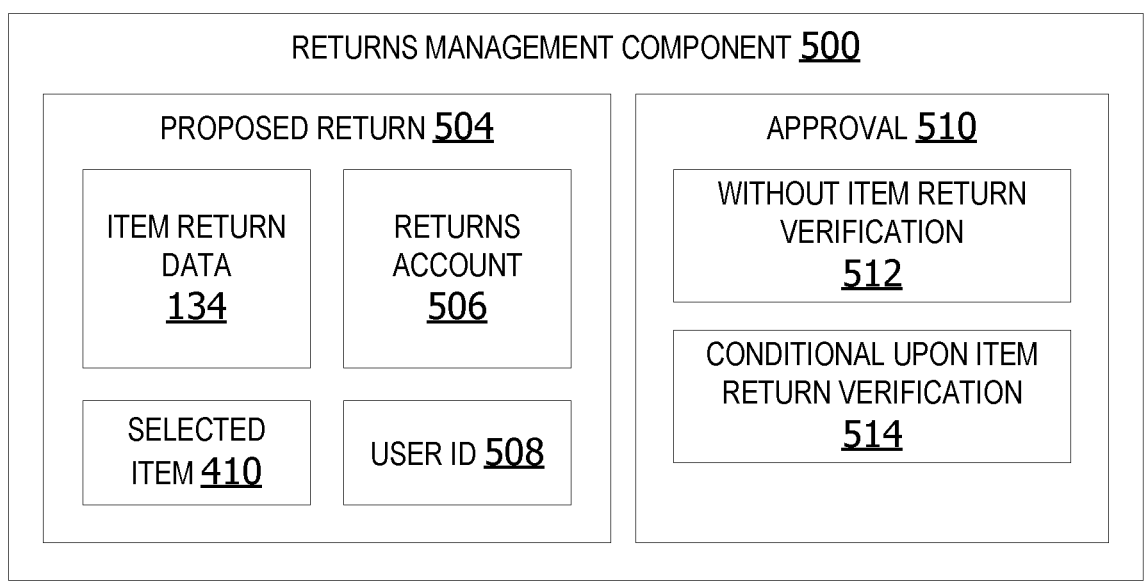
FIG. 5 is an exemplary block diagram illustrating a returns manager component for managing proposed item self-returns.

FIG. 5 is an exemplary block diagram illustrating a returns management component 500 for managing proposed item self-returns. The returns management component 500 receives item return data 134 associated with a proposed return 504 of a selected item 410. The item return data can be received from a self-returns application associated with a user device or via input provided by the user via a user interface component, such as, but not limited to, a transaction code obtained from a receipt. The item return data can also be retrieved from a database or other data storage device based on data obtained from scanning an item identifier or a receipt.

The item return data 134 can include an identification of the selected item 410, a category of the selected item, an amount paid for the item, a time and/or date of purchase, a location where the transaction was completed, location where the item was received or picked up, etc. A returns account 506 for the user can include user provided data, such as a user identification (ID) 508, a user name, password, login information, a self-returns opt-in registration provided by the user to participate in the unassisted self-returns, or other user-provided data.

The returns management component 500 can provide approval 510 for the user to complete the proposed item return without item return verification 512 where the user is authorized to retain possession of the selected item 410 being returned. In other examples, the returns management component 500 provides approval 510 for the user to complete the proposed item return condition upon item return verification 514 where the user is instructed to return the item to a designated item return area prior to allocation of a refund amount to the user for return of the selected item 410.

Figure 6:
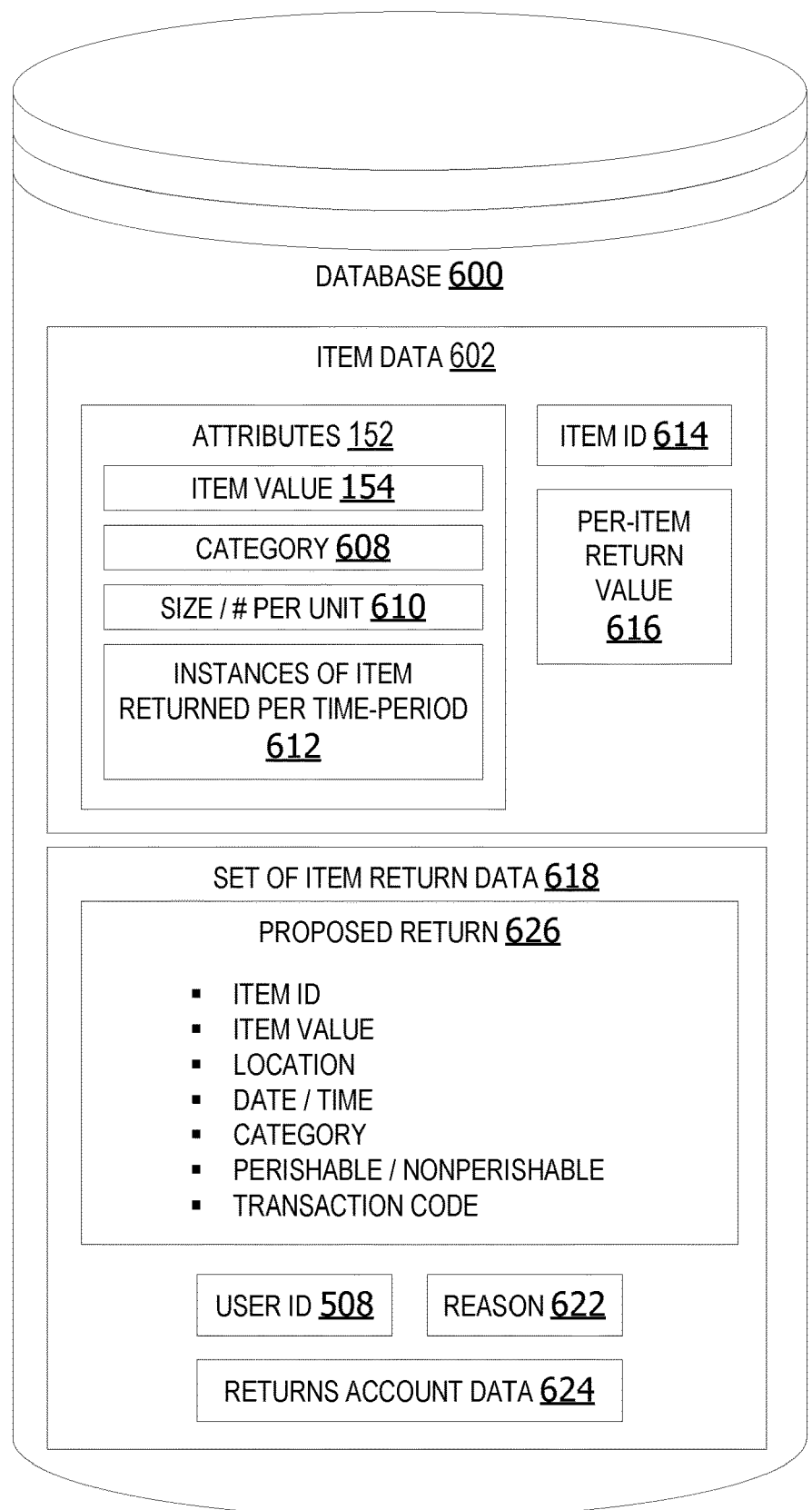
FIG. 6 is an exemplary block diagram illustrating a database storing item return data.

FIG. 6 is an exemplary block diagram illustrating a database 600 storing item return data. The database 600 can be implemented on a data storage, such as the data storage device 132 or the cloud storage 120 in FIG. 1. The database 600 can include, without limitation, item data 602, including item attributes 152. The item attributes 152 can include item value 154, category 608, size or number of items per unit 610, and/or instances of the item returned per time-period 612. The item value 154t can be a base price of the item, a discount/clearance price, an amount paid for the item, or any other value associated with the item. The item attributes can optionally also include item expiration dates associated with perishable items, cold-chain compliance requirements associated with perishable items, or any other item data.

The item data 602 can include an item identifier (ID) 614 for identifying a specific instance of an item, a type of an item, or a category of an item. In a non-limiting example, the item ID 614 identifies an item as a dairy category, a gallon of milk (type), or one specific gallon of milk having a unique ID that is different than all other gallon jugs of milk. The item attributes can also include data indicating whether an item is hazardous or requires special handling, such as paint remover, lighter fluid, or other ingredients/contents requiring special care.

A set of item return data 618 can include return data associated with a proposed return 626, such as, but not limited to, a location of a proposed item return (online or in-store), location of item purchase, date of proposed return, time proposed return initiated, item ID, item value, category of the item, whether the item is perishable or non-perishable, a transaction code associated with the item, etc. The set of item return data can include data, such as, but not limited to, the item return data 134 in FIG. 1, FIG. 3 and/or FIG. 5.

The item return data can optionally include a user ID 508 identifying a user, a reason 622 for the return of the item, and/or returns account data 624 associated with the user. The reason 622 can include reasons such as, wrong item, damaged item, etc.

Figure 7:
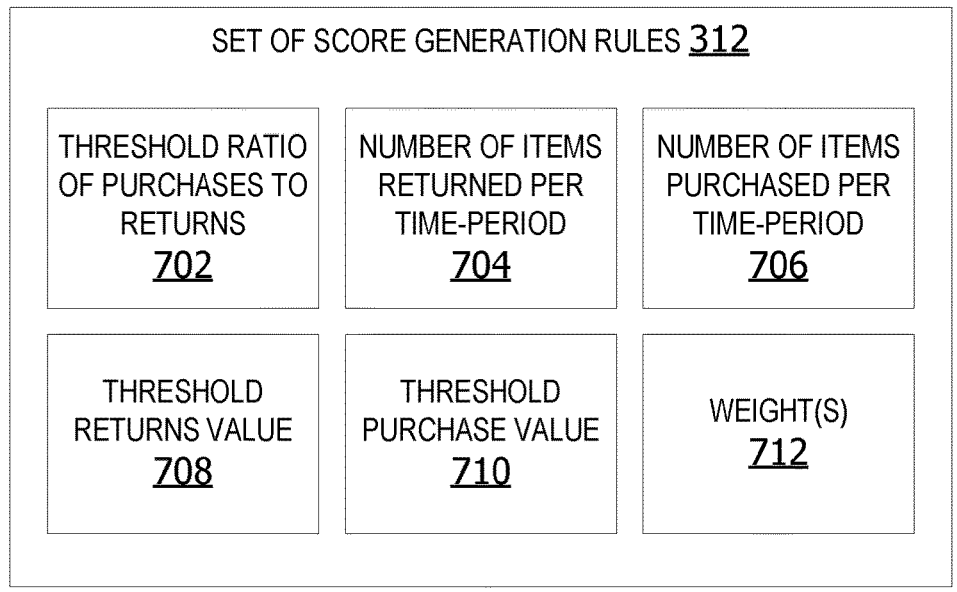
FIG. 7 is an exemplary block diagram illustrating a set of score generation rules.

FIG. 7 is an exemplary block diagram illustrating a set of score generation rules 312. The set of score generation rules 312 includes one or more rules for generating a return-trust score for a user. The set of score generation rules 312 can include a threshold ratio of purchases to returns 702 made by the user and/or an amount of adjustment up (number of points added) or adjusted downward (points subtracted) from the score based on ration and/or changes in the ratio.

The set of score generation rules 312 can include a number of items returned per a time-period 704 by the user and/or an indication of a score adjustment amount based on the number of successful returns of items and/or unsuccessful attempted returns (fraudulent returns). A number of items obtained via purchase within a given time-period 706 and/or an amount of adjustment of the score up or down based on the number of items purchased within the time-period. The time-period can be any configurable time-period, such as, but not limited to, a one-year time period, a four-year time period, a seven-year time period, or any other amount of item.

The set of score generation rules 312 can also include threshold returns value 708, threshold purchase value 710, and/or weight(s) 712. The weight(s) 712 indicate which rules have greater precedence/weight when calculating the return-trust score for a user. For example, if a user has one successful item return with a receipt and one item return without a receipt, the weights indicate how much weight to accord the successful return and how much weight to accord the return without a correct receipt.

Figure 8:
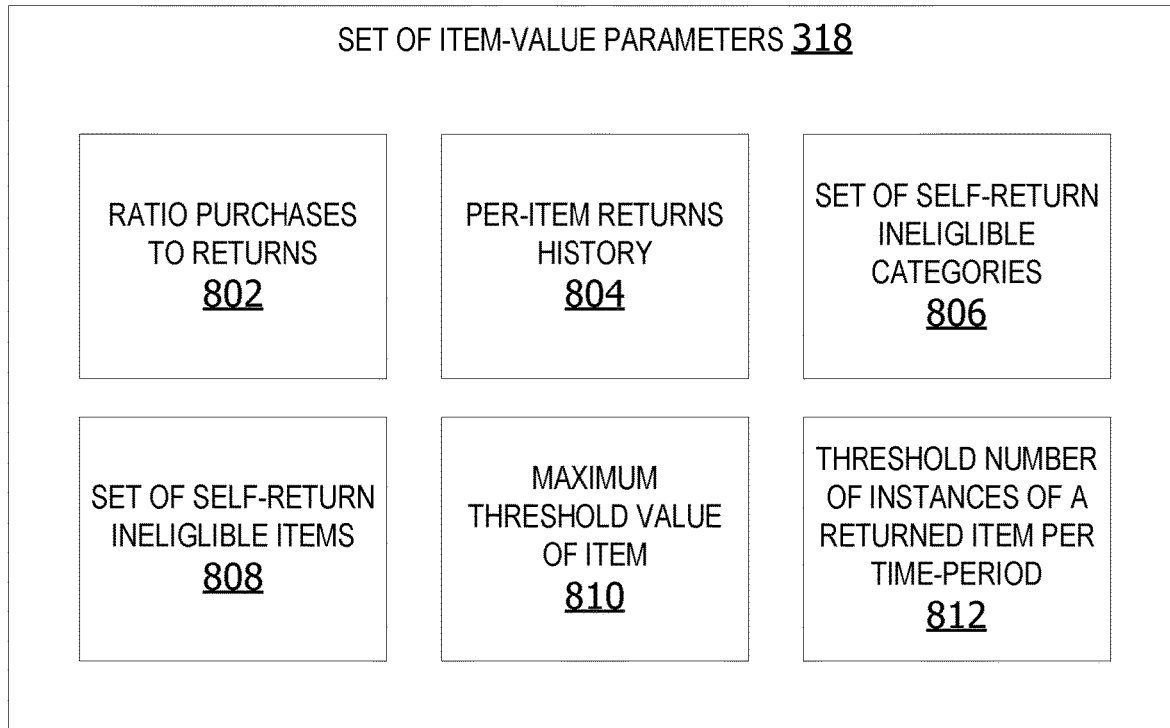
FIG. 8 is an exemplary block diagram illustrating a set of item-value parameters.

FIG. 8 is an exemplary block diagram illustrating a set of item-value parameters 318. The set of item-value parameters 318 can include a ratio of purchases to returns of the selected item by a plurality of users within a predetermined time-period 802. If an item has an unusually large number of item returns when compared with purchases of the item, the ratio can indicate returns of the item should be supervised by an associate.

The per-item returns history 804 can also indicate the number of instances of a given item returned within a predetermined time-period. If the number is unusually high, it can indicate user-supervision/assistance during item return is advisable. In other words, an unusually high number of returns can indicate suspicious returns activity associated with this type of item. For example, if a large number of memory sticks are being returned, it indicates increased monitoring (assistance) recommended.

A set of self-return ineligible categories 806 is a set of one or more categories of items which are ineligible for unassisted self-return. In some example, but without limitation, the set of self-return ineligible categories includes high-end categories of items, such as, but not limited to, televisions, jewelry, video game consoles, smart phones, etc. If a user attempts to return a television in this example, the system identifies a category of the item as an ineligible category based on the set of item-value parameters. The system directs the user to wait for a returns manager to assist the user with completion of the transaction.

A set of self-return ineligible items 808 can include one or more items which do not qualify for unassisted self-return due to their value, high-rate of fraudulent returns of the item, or other attributes. In one example, the set of self-return ineligible items 808 includes a watch. If a user attempts to return the watch via the self-return system, the authorization component does not authorize the unassisted return of the item based on the set of self-return ineligible items 808 in the set of item-value parameters in this example.

Figure 9:
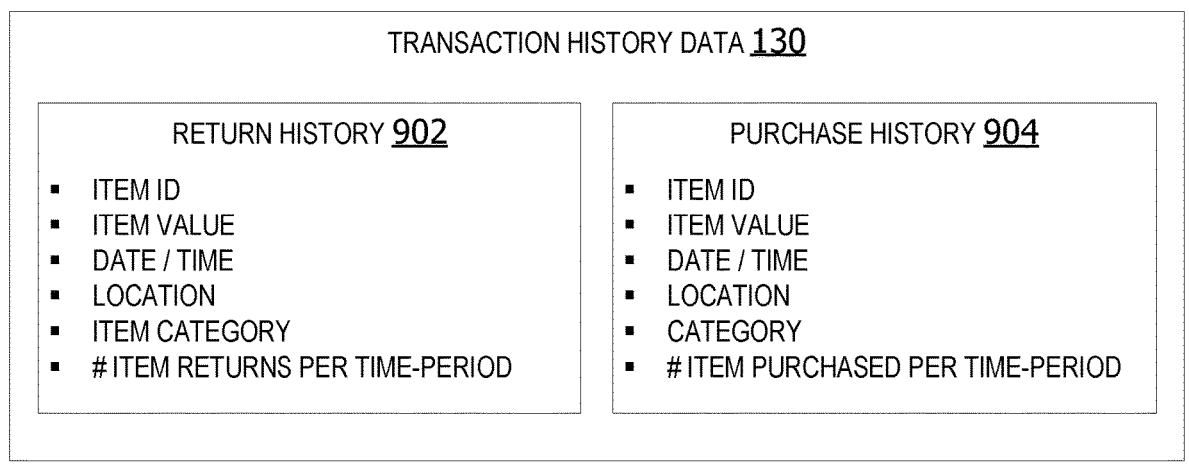
FIG. 9 is an exemplary block diagram illustrating transaction history data.

FIG. 9 is an exemplary block diagram illustrating transaction history data 130. The transaction history data 130 includes item return history 902 and/or item purchase history 904 of a selected user. The transaction history data can optionally also include a method of payment used during a transaction, a credit score of the user, and/or any issues associated with attempted item returns. Return issues can include lack of a receipt, lack of packaging associated with an item, loss of the item to be returned, damaged/broken item, etc.

In some examples, the item purchase history 904 is used to infer a returns profile for a user. The item purchase history 904 is utilized as first factor of building a return-trust value for the user.

Figure 10:
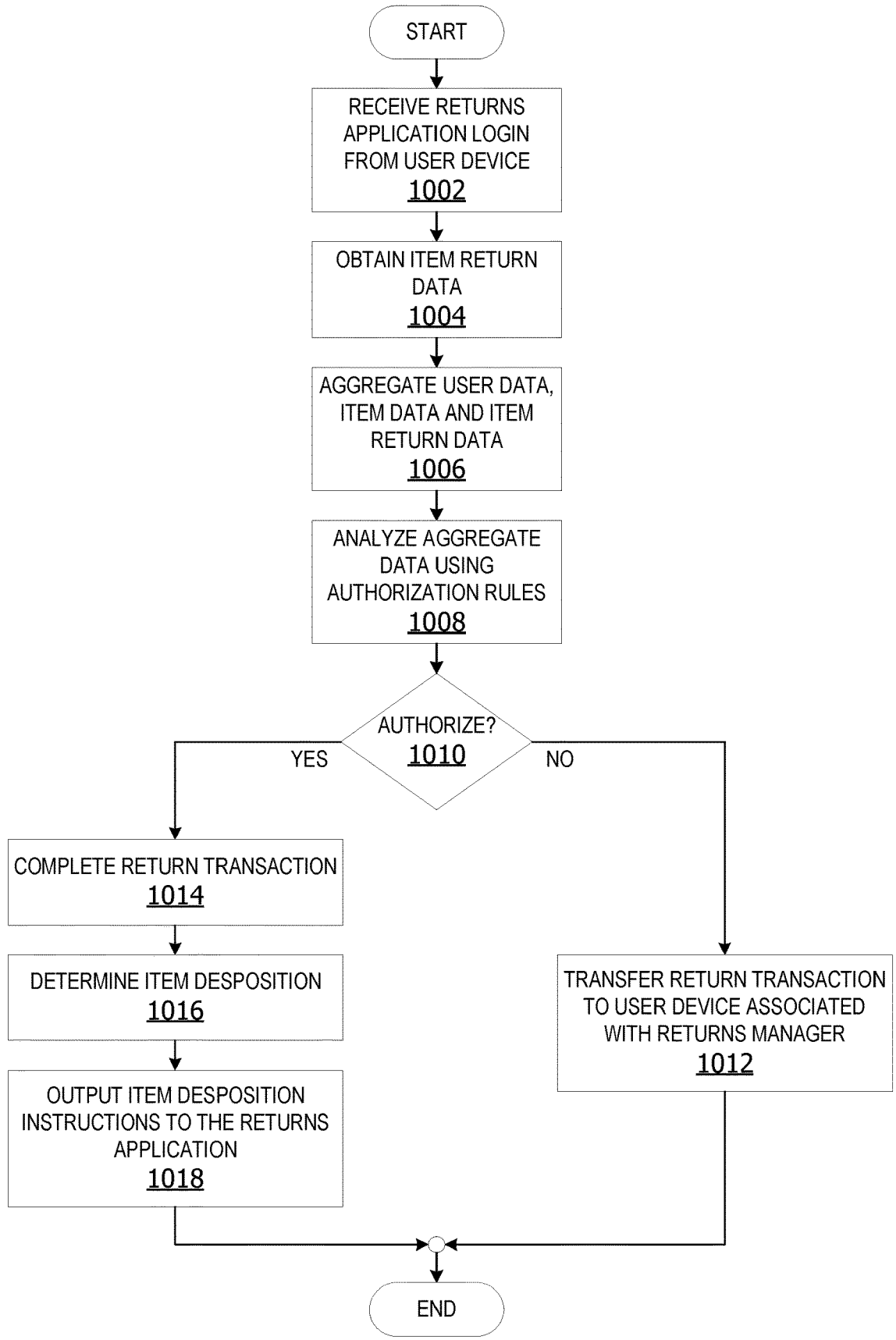
FIG. 10 is an exemplary flow chart illustrating operation of the computing device to manage self-returns of items.

FIG. 10 is an exemplary flow chart illustrating operation of the computing device to manage self-returns of items. The process shown in FIG. 10 can be performed by a customized returns manager component, executing on a computing device, such as the computing device 102 or the user device 116 in FIG. 1.

The process begins by receiving self-returns application login from user device at 1002. The customized returns manager component obtains item return data at 1004. The customized returns manager component aggregates user data, item data, and item return data at 1006. A return authorization component analyzes the aggregated data using authorization rules at 1008. The return authorization component is a component that analyzes a per-user return-trust score and/or a per-item return value using authorization rules to determine whether to authorize an unassisted self-return of an item, such as, but not limited to, the return authorization component 322 in FIG. 3.

The return authorization component determines whether to authorize the self-return at 1010. If no, the return transaction is transferred to a user device associated with a returns manager at 1012. The process terminates thereafter.

If the return authorization component authorizes the unassisted self-return of the item, the return transaction is completed by the customized returns manager component at 1014. An item disposition component determines item disposition at 1016. The item disposition component is a component for determining disposition of a returned item, such as the item disposition component 334 in FIG. 3.

Item disposition instructions are output to the user at 1018. The instructions can be output by a notification component, such as, but not limited to, the notification component 416 in FIG. 4. In some examples, the instructions are output to a self-returns application on a user device, such as the user device 116 in FIG. 1. In other examples, the instructions are output via a user interface associated with a kiosk, such as the kiosk 208 in FIG. 2. The process terminates thereafter.

While the operations illustrated in FIG. 10 are performed by a computing device, aspects of the disclosure contemplate performance of the operations by other entities. For example, a cloud service can perform one or more of the operations.

Figure 11:
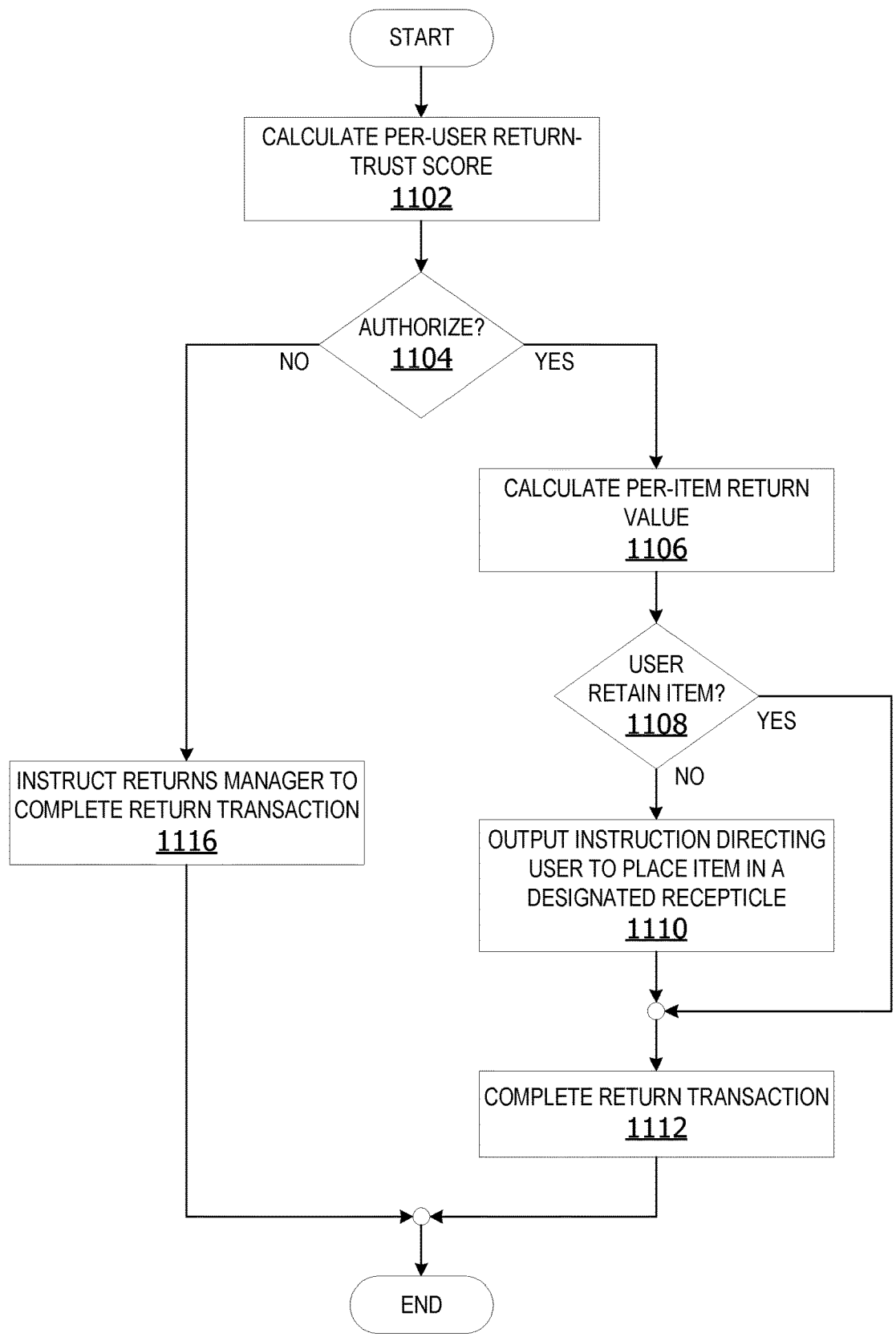
FIG. 11 is an exemplary flow chart illustrating operation of the computing device to provide customized self-returns of items.

FIG. 11 is an exemplary flow chart illustrating operation of the computing device to provide customized self-returns of items. The process shown in FIG. 11 can be performed by a customized returns manager component, executing on a computing device, such as the computing device 102 or the user device 116 in FIG. 1.

The process begins by calculating a per-user return-trust score for a user at 1102. The per-user return-trust score is calculated based on an item value and transaction history data of the user by a component such as, but not limited to, the calculation component 302 in FIG. 3. The authorization component determines whether to authorize self-return of the item at 1104. If yes, the calculation component calculates a per-item return value at 1106.

An item disposition component determines whether to permit the user to retain the item being returned at 1108. If no, a notification component outputs an instruction directing the user to place the item in a designated receptacle at 1110. The return transaction is completed at 1112. The customized returns manager component allocates a refund to a returns account of the user at 1114. The process terminates thereafter.

Returning to 1104, if the self-return is unauthorized, the notification component outputs an instruction to a returns manager to complete the return transaction at 1116. The process terminates thereafter.

While the operations illustrated in FIG. 11 are performed by a computing device, aspects of the disclosure contemplate performance of the operations by other entities. For example, a cloud service can perform one or more of the operations.

Figure 12:
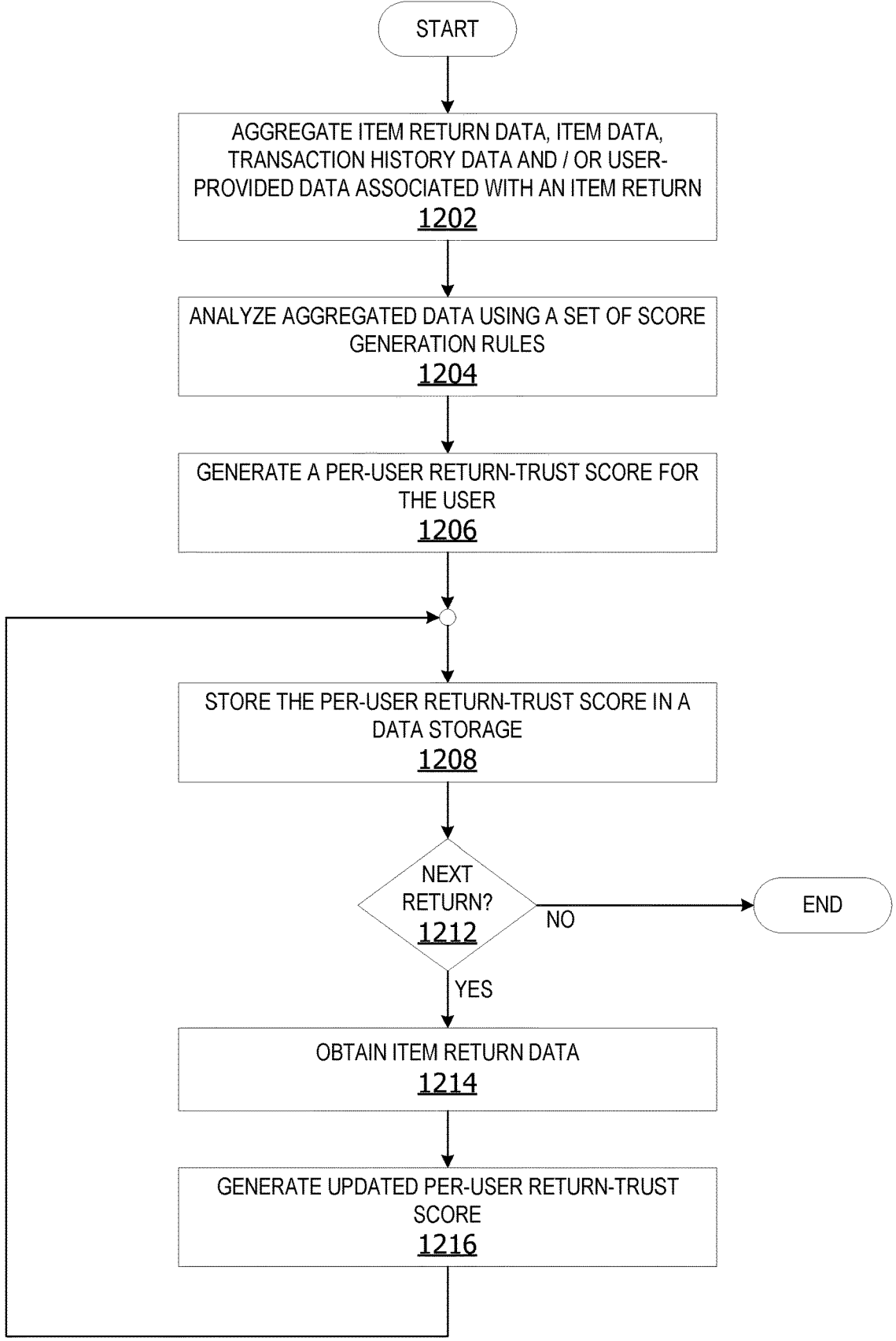
FIG. 12 is an exemplary flow chart illustrating operation of the computing device to generate per-user return-trust score.

FIG. 12 is an exemplary flow chart illustrating operation of the computing device to generate per-user return-trust score. The process shown in FIG. 12 can be performed by a customized returns manager component, executing on a computing device, such as the computing device 102 or the user device 116 in FIG. 1.

The process begins by aggregating item return data, item data, transaction history data, and/or user-provided data associated with an item return at 1202. A calculation component analyzes the aggregated data using a set of score generation rules at 1204. The calculation component generates a per-user return-trust score for the user at 1206. The customized returns manager component determines if there is a next return at 1212. If yes, item return data is obtained at 1214. An updated per-user return-trust score is generated at 1216. The customized returns manager component iteratively executes operations 1208 through 1216 until there is no next return at 1212. The process terminates thereafter.

While the operations illustrated in FIG. 12 are performed by a computing device, aspects of the disclosure contemplate performance of the operations by other entities. For example, a cloud service can perform one or more of the operations.

Figure 13:
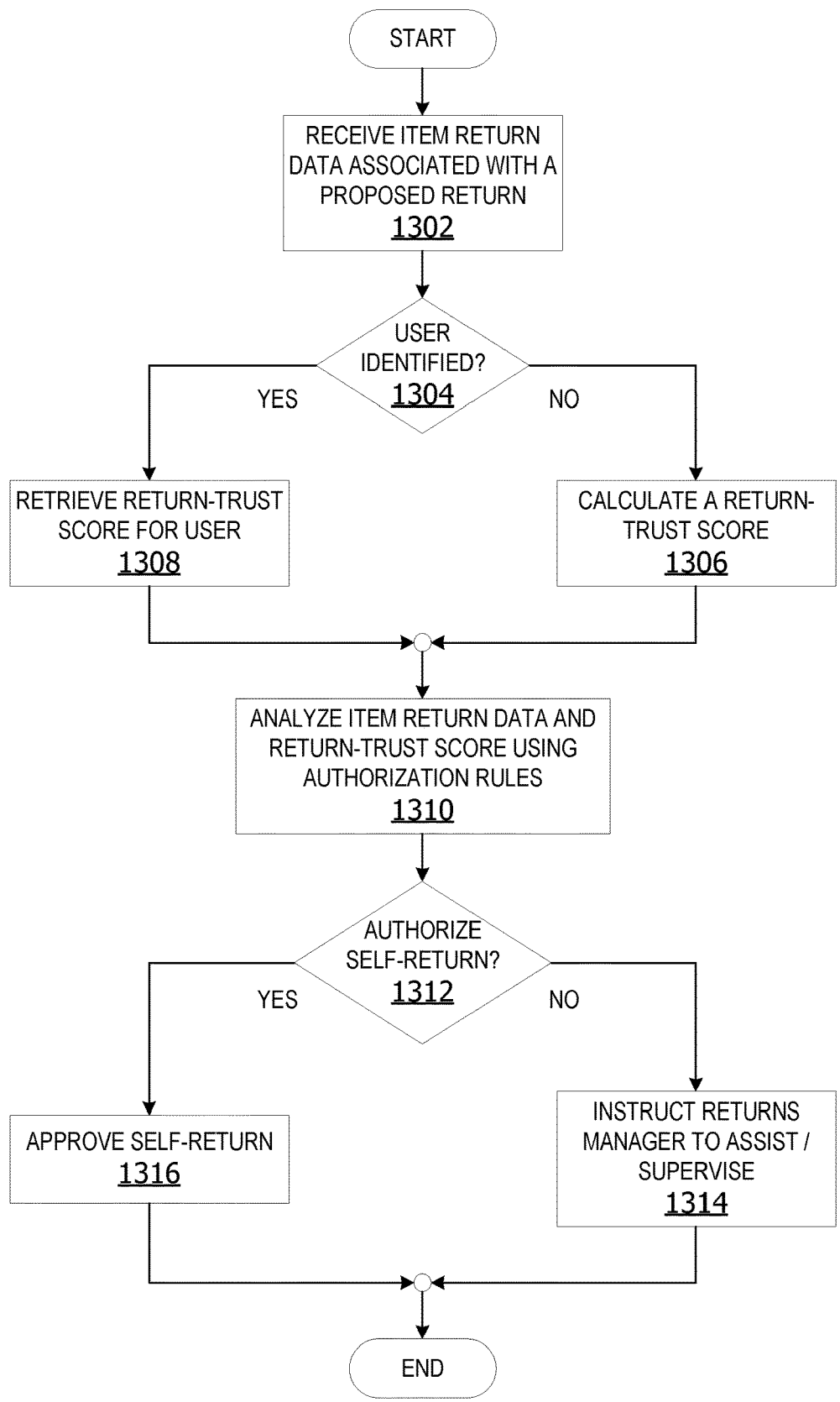
FIG. 13 is an exemplary flow chart illustrating operation of the computing device to authorize self-return based on a return-trust score.

FIG. 13 is an exemplary flow chart illustrating operation of the computing device to authorize self-return based on a return-trust score. The process shown in FIG. 13 can be performed by a customized returns manager component, executing on a computing device, such as the computing device 102 or the user device 116 in FIG. 1.

The process begins by receiving item return data associated with a proposed return at 1302. A determination is made whether the user is identified at 1304. If no, a return-trust score is calculated for the user at 1306 based on the item return data. If the user is identified, the return-trust score for the user is retrieved at 1308. A return authorization component analyzes the item data and return-trust score using authorization rules at 1310. The return authorization component determines whether to authorize self-return at 1312. If no, a task assignment component, such as the task assignment component 402 in FIG. 4, instructs a returns manager to assist/supervise the return transaction at 1314. The process terminates thereafter.

If the self-return is authorized at 1312, the self-return of the item is approved at 1316. The process terminates thereafter.

While the operations illustrated in FIG. 13 are performed by a computing device, aspects of the disclosure contemplate performance of the operations by other entities. For example, a cloud service can perform one or more of the operations.

Figure 14:
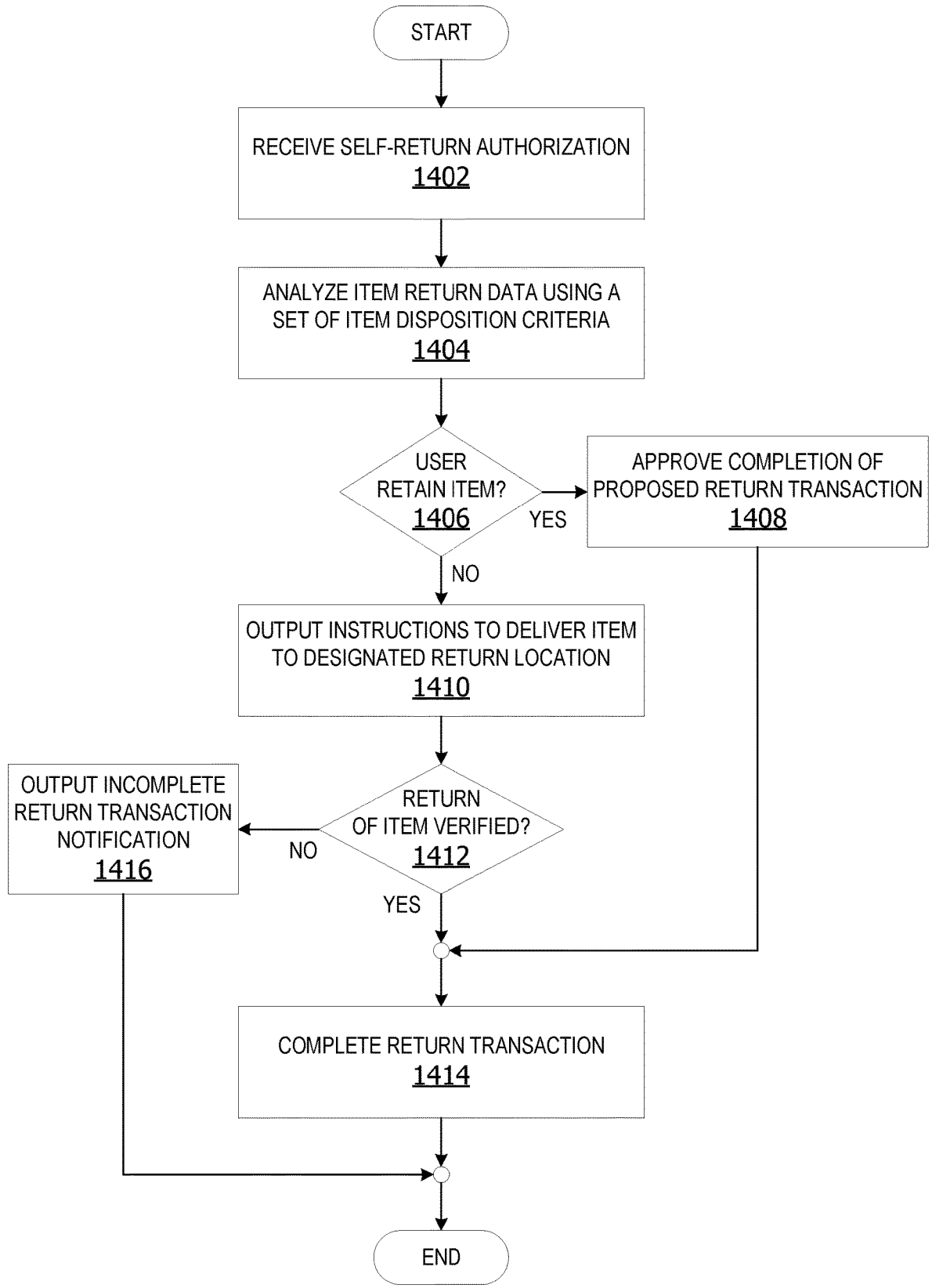
FIG. 14 is an exemplary flow chart illustrating operation of the computing device to complete self-return transactions without user intervention.

FIG. 14 is an exemplary flow chart illustrating operation of the computing device to complete self-return transactions without user intervention. The process shown in FIG. 14 can be performed by a customized returns manager component, executing on a computing device, such as the computing device 102 or the user device 116 in FIG. 1.

The process begins by receiving a self-return authorization from a return authorization component at 1402. An item disposition component analyzes item return data using a set of item disposition criteria at 1404. The item disposition component determines whether to permit the user to retain the item at 1406. If yes, the returns management component approves completion of the return transaction at 1408. The return transaction is completed at 1414 without obtaining the returned item from the user. The process terminates thereafter.

If the user is not permitted to retain the item at 1406, a notification component outputs an instruction to the user to deliver the item to a designated return location at 1410. The item disposition component determines whether return of the item is verified at 1412. If yes, the return transaction is completed at 1414. The process terminates thereafter.

Returning to 1412, if return of the item to the designated return location is unverified, the notification component outputs an incomplete return transaction notification to the user device associated with the user at 1416. The process terminates thereafter.

While the operations illustrated in FIG. 14 are performed by a computing device, aspects of the disclosure contemplate performance of the operations by other entities. For example, a cloud service can perform one or more of the operations.

Figure 15:
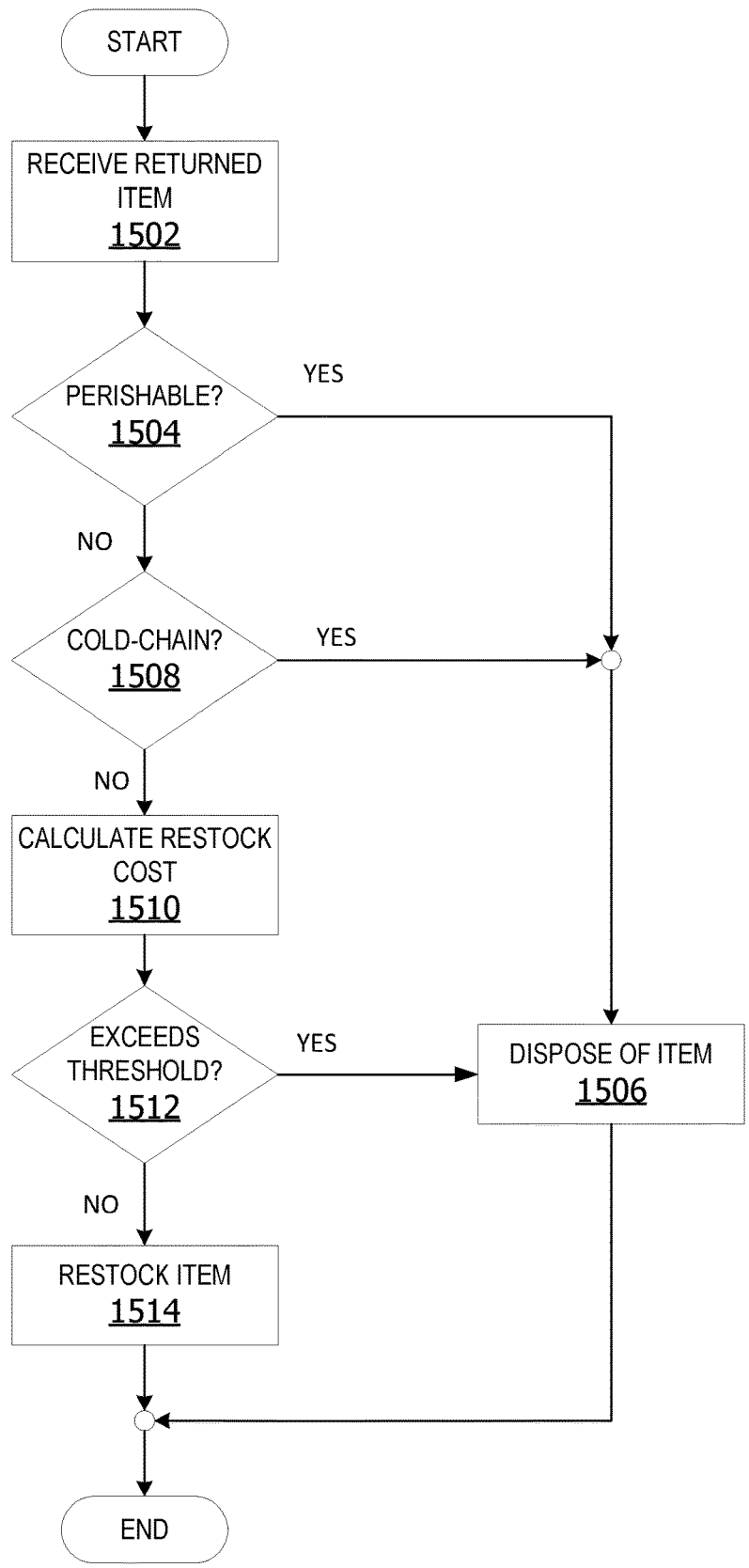
FIG. 15 is an exemplary flow chart illustrating operation of the computing device to determine item disposition instructions for a returned item.

FIG. 15 is an exemplary flow chart illustrating operation of the computing device to determine item disposition instructions for a returned item. The process shown in FIG. 15 can be performed by a customized returns manager component, executing on a computing device, such as the computing device 102 or the user device 116 in FIG. 1.

The process begins by receiving a returned item at 1502. The returned item is received from a user at a designated return location, such as the designated return location 148 in FIG. 1, FIG. 2 and/or FIG. 3. The item disposition component determines if the item is perishable at 1504. If yes, a user is instructed to dispose of the item at 1506. The user instructed to dispose of the item can be customer service manager or other personnel tasked with assisting customers with item returns, such as, but not limited to, the user 146 in FIG. 1. The process terminates thereafter.

If the item is not perishable at 1504, the item disposition component determines if the item is a cold-chain item requiring cold-chain compliance at 1508. If yes, the user is instructed to dispose of the item at 1506. The process terminates thereafter.

If the item is not a cold-chain item at 1508, the item disposition component calculates a restock cost at 1510. The item disposition component determines if the restock cost exceeds a threshold at 1512. If yes, the user is instructed to dispose of the item at 1506. The process terminates thereafter.

Returning to 1512, if the restock cost does not exceed a threshold restock value, the item disposition component instructs the user to restock the item at 1514. The process terminates thereafter.

While the operations illustrated in FIG. 15 are performed by a computing device, aspects of the disclosure contemplate performance of the operations by other entities. For example, a cloud service can perform one or more of the operations.

Figure 16:
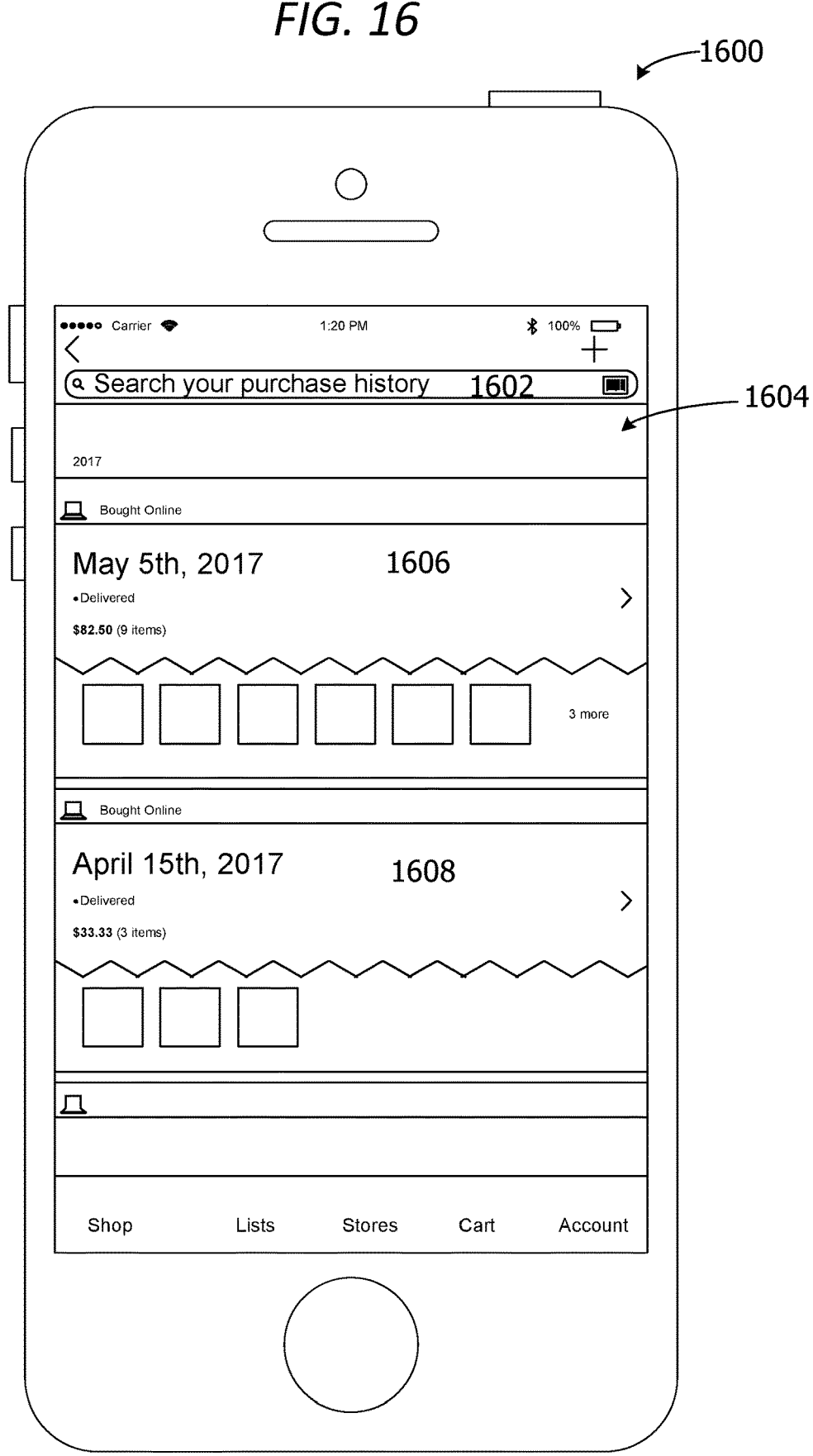
FIG. 16 is an exemplary block diagram illustrating a screenshot of a user device displaying a previous history for the user.

FIG. 16 is an exemplary block diagram illustrating a screenshot 1600 of a user device displaying a previous purchase history 1602 for the user. In this example, the portion of the purchase history 1602 displayed on the screen 1604 includes a record 1606 for a set of items purchased on May 5, 2017 and another record 1608 for a set of one or more items purchased on Apr. 15, 2017. The examples are not limited to two item orders in transaction history data. The previous purchase history 1602 is part of the transaction history data for the user associated with the user device.

Figure 17:
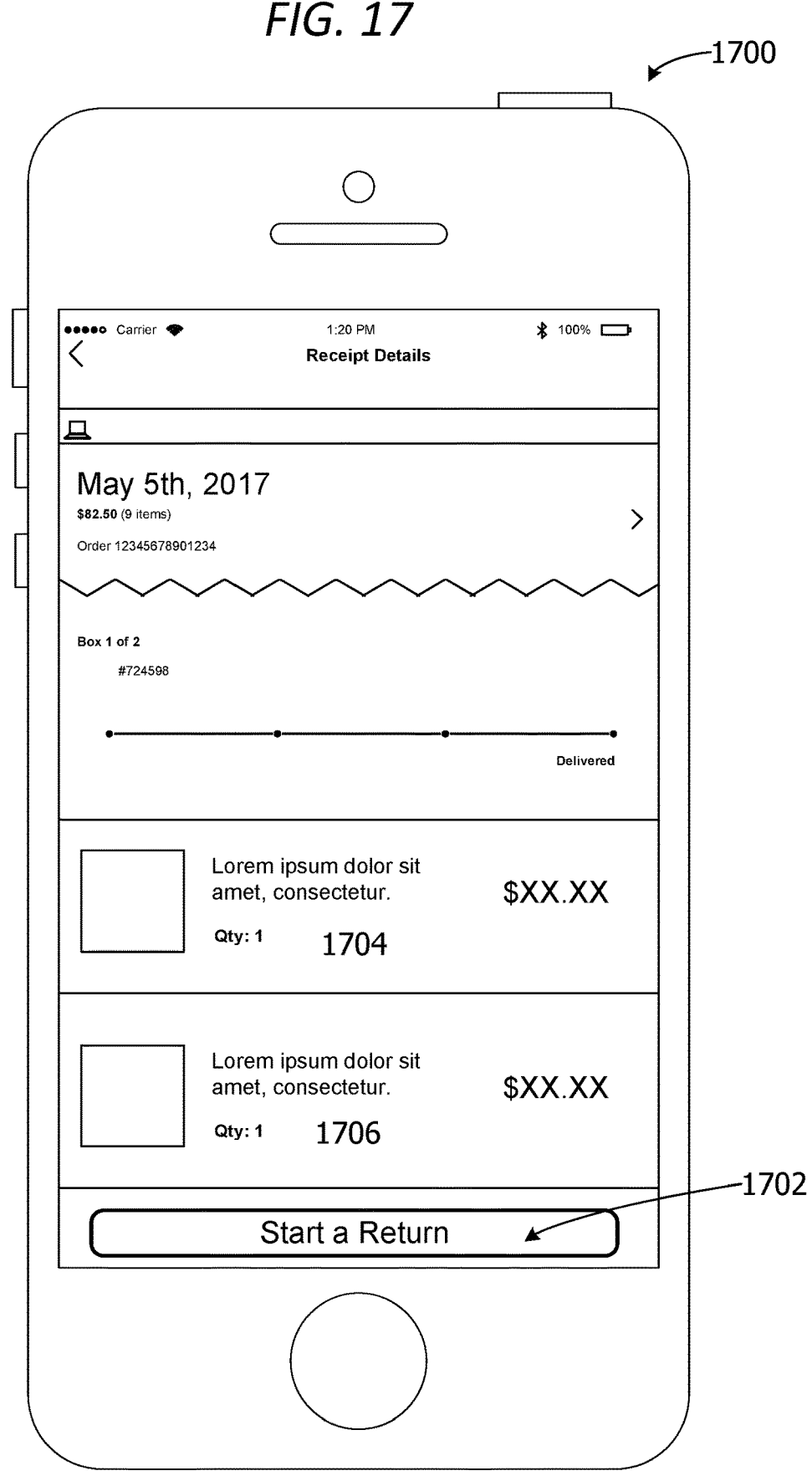
FIG. 17 is an exemplary block diagram illustrating a screenshot of a user device displaying item data associated with a previous transaction.

FIG. 17 is an exemplary block diagram illustrating a screenshot 1700 of a user device displaying item data associated with a previous transaction. The previous transaction in this non-limiting example occurred on May 5, 2017 in this example. The user can select a "start a return" icon 1702 in this non-limiting example to initiate a return of one or more items associated with the displayed transaction via the self-returns application.

In this non-limiting examples, the transaction of May 5, 2017 includes two items, item 1704 and item 1706. The user can select either item 1704 or item 1706. The user can alternatively select both items 1704 and 1706 for return. The examples are not limited to a transaction involving two items as shown here. In other examples, a single transaction can include purchase/return of a single item, as well as three or more items.

Figure 18:
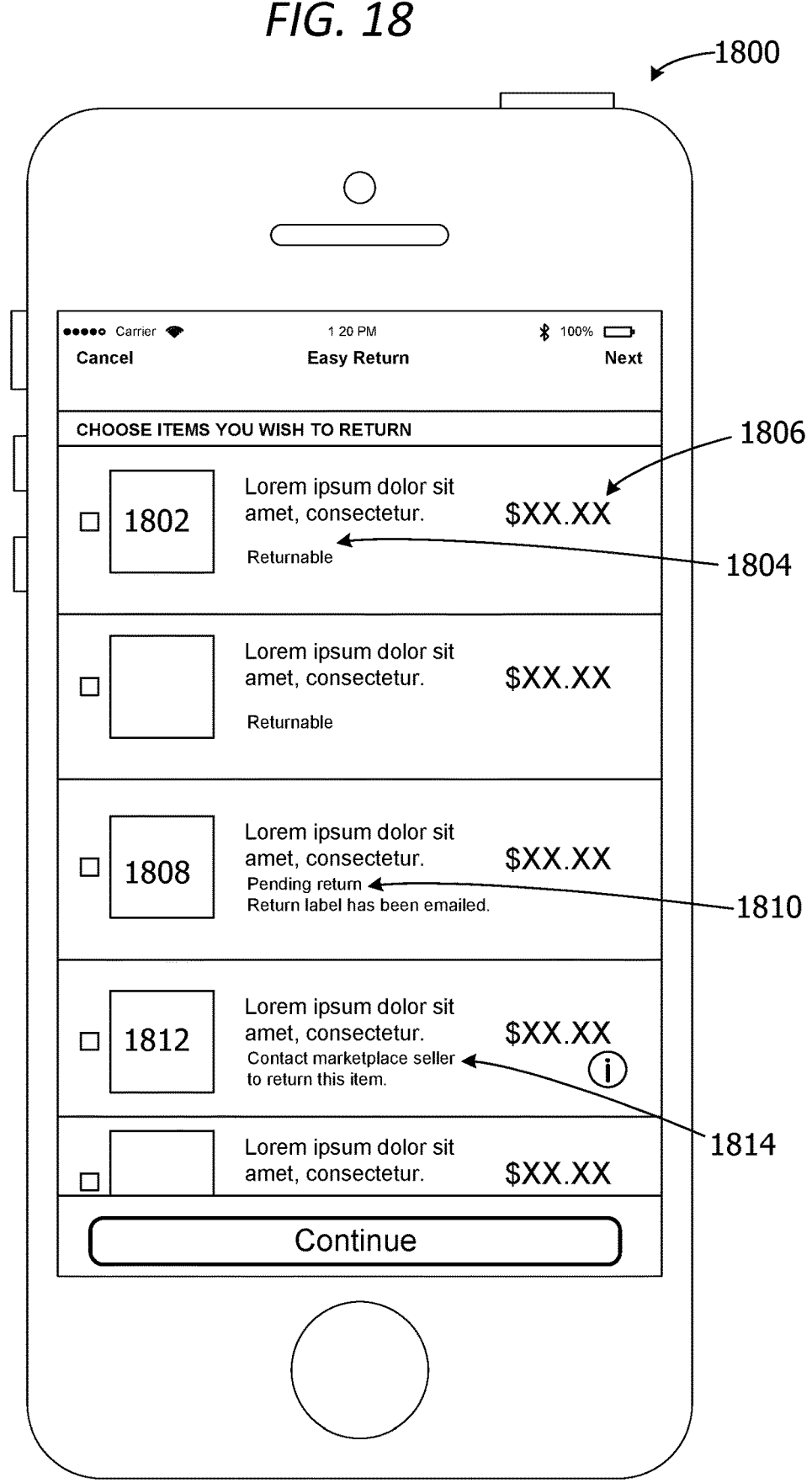
FIG. 18 is an exemplary block diagram illustrating a screenshot of a user device displaying a set of items obtained in a single transaction.

FIG. 18 is an exemplary block diagram illustrating a screenshot 1800 of a user device displaying a set of items purchased in a single purchase transaction. The self-returns application can include an identifier or status indicating whether an item qualifies for return, a return request is being processed "pending return", or an item is unqualified for return/already returned in this non-limiting example. The user can select an item qualified for return to initiate a self-return process.

In this non-limiting examples, the information displayed for item 1802 includes a "returnable" indicator 1804 indicating the item 1802 previously purchased by the user qualifies for return. The record for item 1802 also includes the purchase price 1806 for the item. The information displayed for item 1808 includes a "pending return" indicator 1810 indicating that a return of item 1808 has been initiated but not yet completed. The record for item 1812 includes a "contact marketplace seller" 1814 indicating that if the user wishes to initiate a return of the item, the user should contact the seller of the item. The application in some examples provides an icon or other contact information for initiating contact with the marketplace seller.

Figure 19:
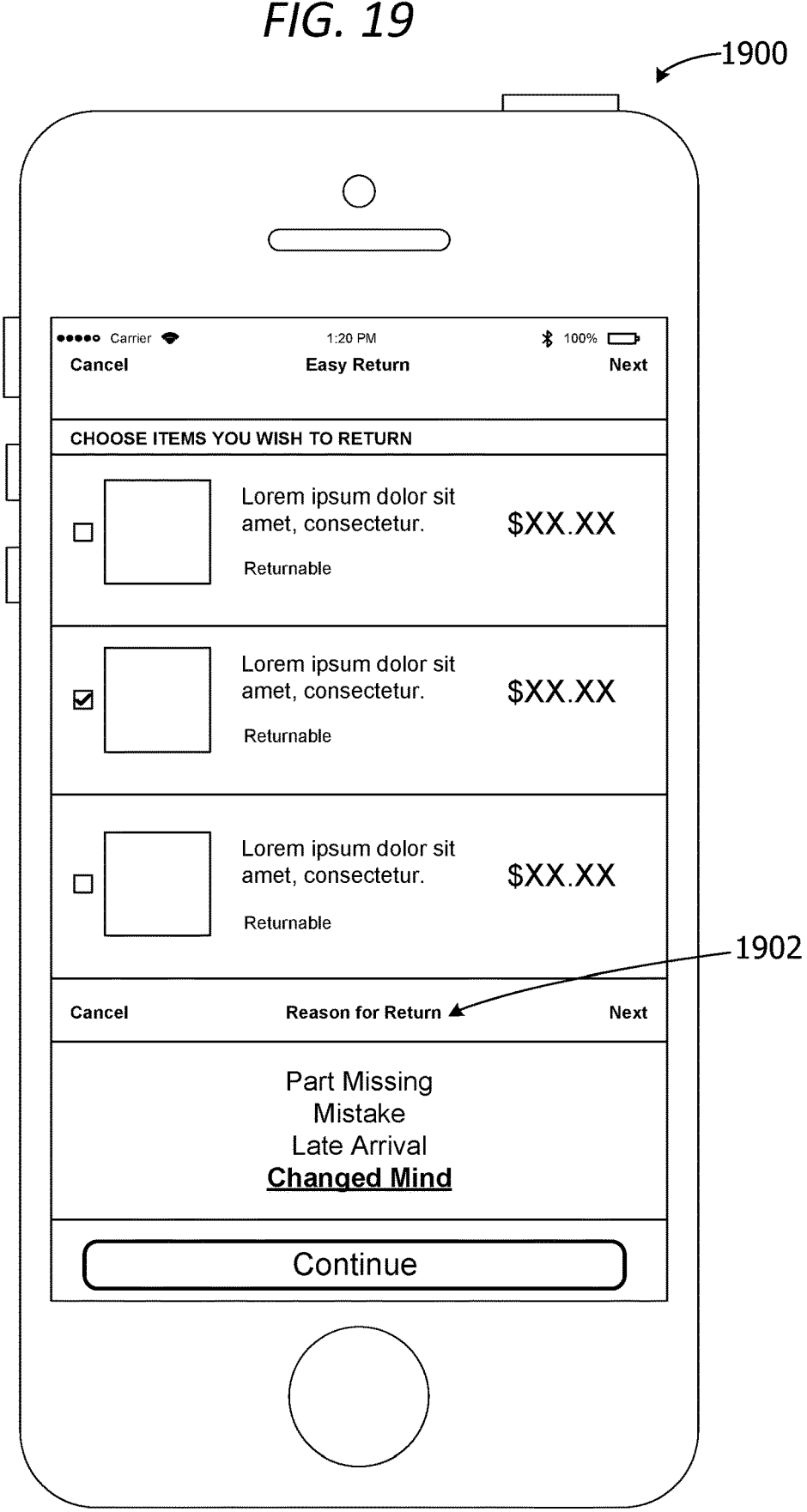
FIG. 19 is an exemplary block diagram illustrating a screenshot of a user device displaying an item selected for return and providing an option permitting a user to select a reason for returning the selected item.

FIG. 19 is an exemplary block diagram illustrating a screenshot 1900 of a user device displaying an item selected for return and providing an option permitting a user to select a reason 1904 for returning the selected item. In some examples, the application provides a list of reasons for the item return, such as, but not limited to, item arrived late, the item was ordered by mistake, a part was missing and/or the user changed their mind about purchasing the item. In this example, the user has indicated that the user wants to return the item because the user has changed their mind. Other options which may be provided include, without limitation, that an item was the wrong color, wrong size, damaged in the mail, non-operational, or any other reason.

Figure 20:
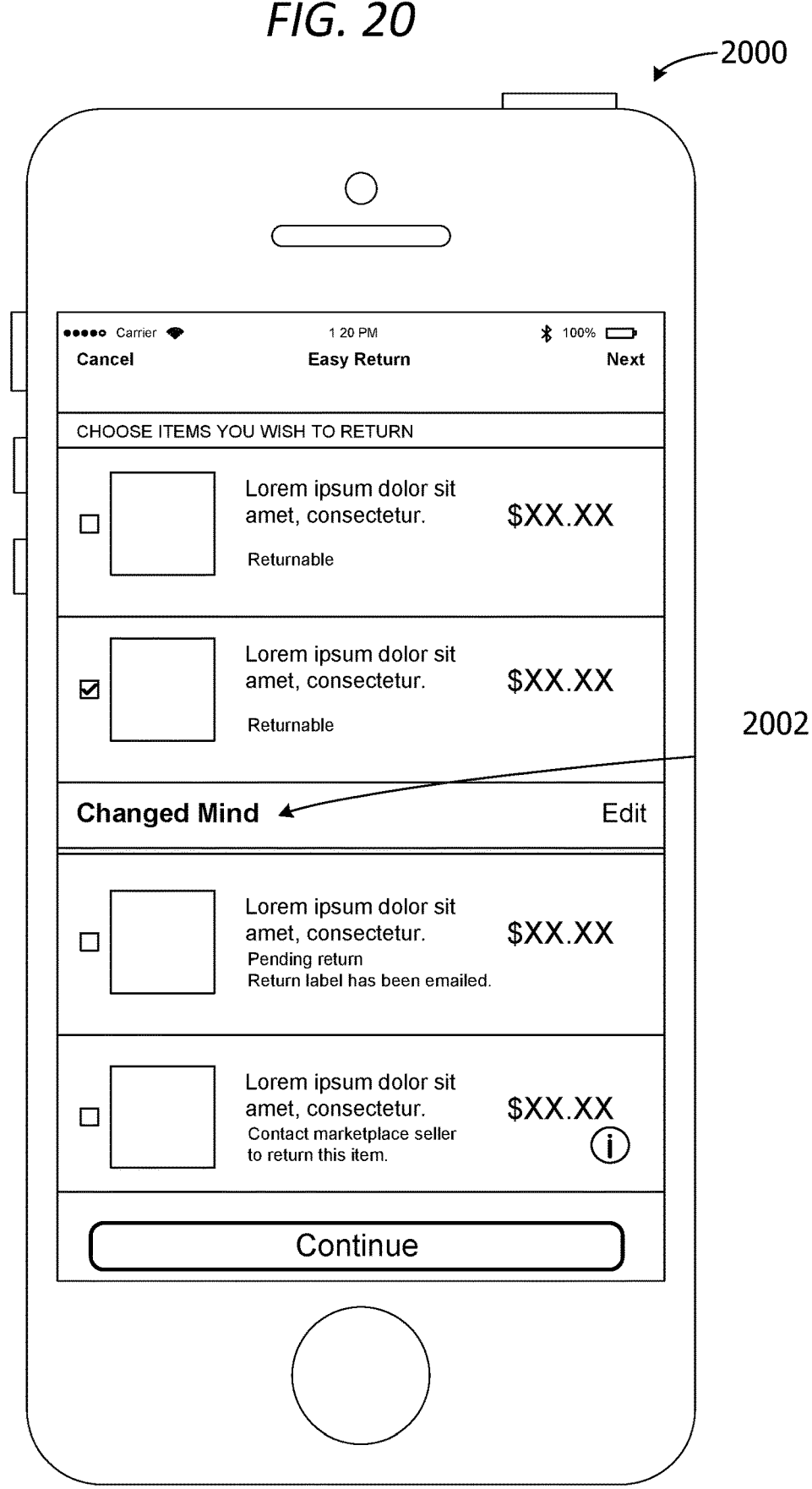
FIG. 20 is an exemplary block diagram illustrating a screenshot of a user device displaying an item selected for return and displaying the user-provided reason for return.

FIG. 20 is an exemplary block diagram illustrating a screenshot 2000 of a user device displaying an item selected for return and displaying the user-provided reason for return 2002.

Figure 21:
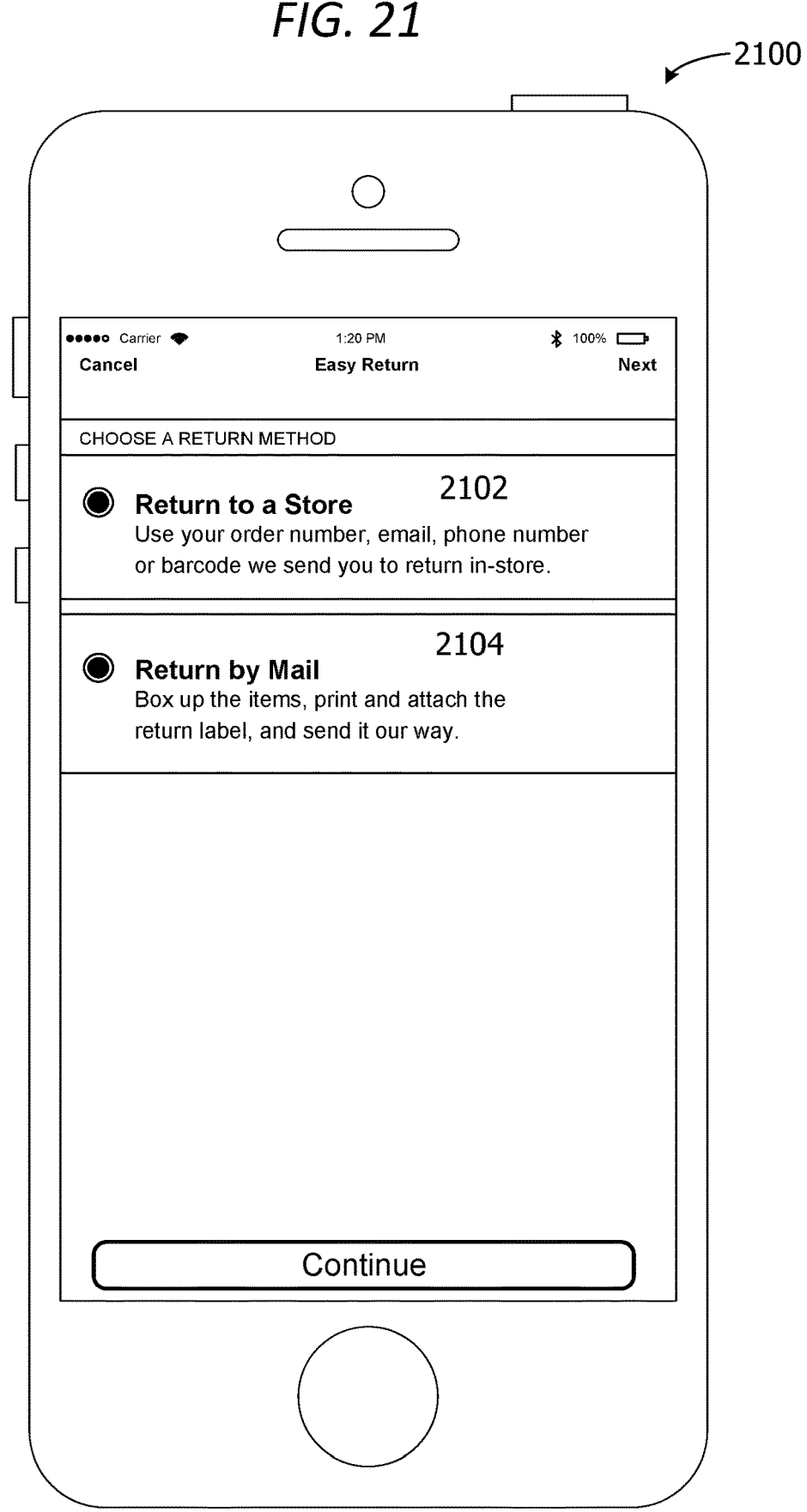
FIG. 21 is an exemplary block diagram illustrating a screenshot of a user device displaying return options for returning the item to a designated return location.

FIG. 21 is an exemplary block diagram illustrating a screenshot 2100 of a user device displaying return options for returning the item to a designated return location. In this non-limiting example, the user clicks on an option to return the item at a store 2102 or return the item via mail 2104.

Figure 22:
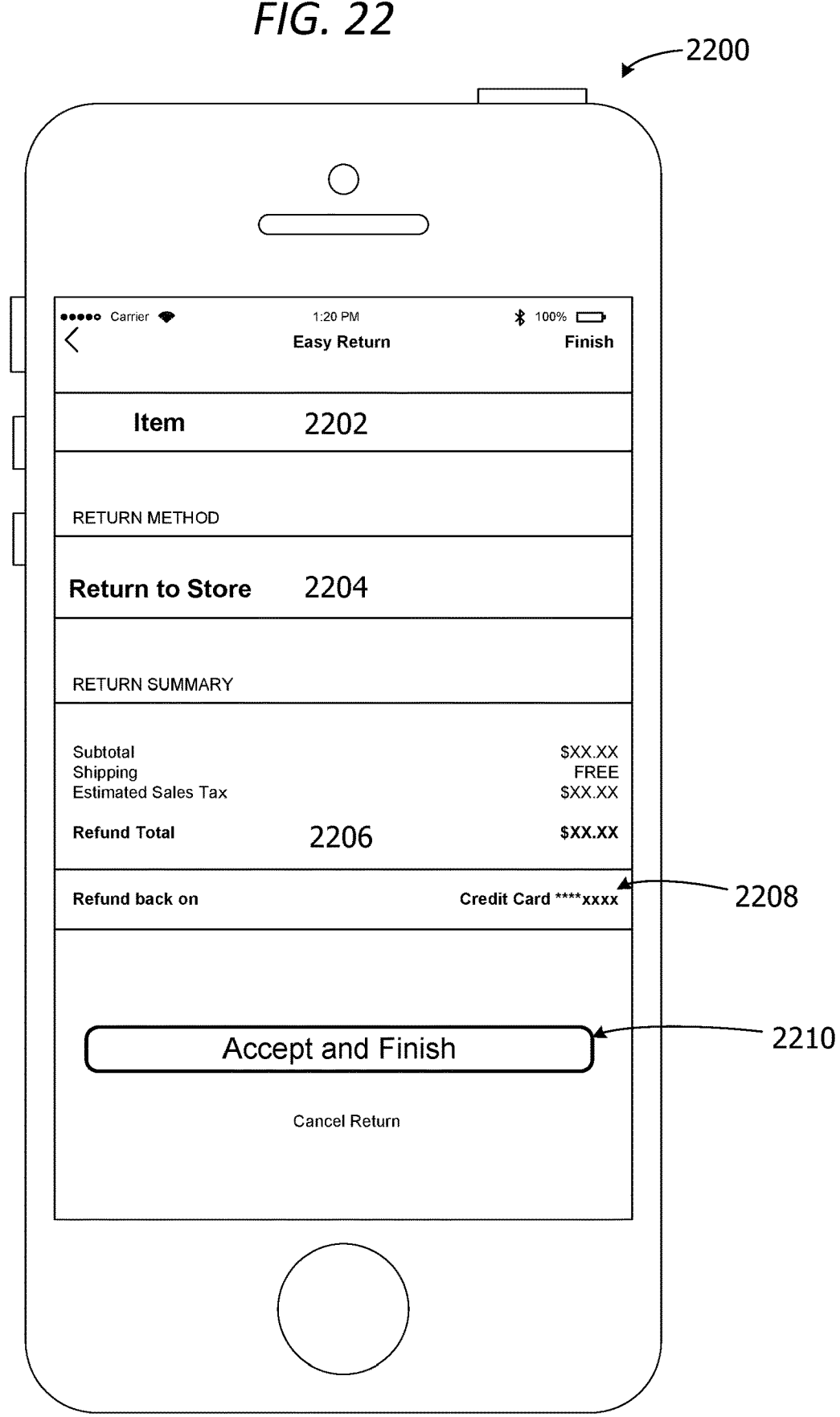
FIG. 22 is an exemplary block diagram illustrating a screenshot of a user device displaying a selected item for return, an amount to be refunded, and a method of providing the refund.

FIG. 22 is an exemplary block diagram illustrating a screenshot 2200 of a user device displaying a selected item 2202 for return, method of return 2204, an amount to be refunded 2206, and a method of providing the refund 2208. In this non-limiting example, the item is to be returned to a store. The refund amount is to be credited back to a credit card of the user. When complete, the user selects an icon 2210 to accept and finish the online return process prior to delivering the item to the store.

Figure 23:
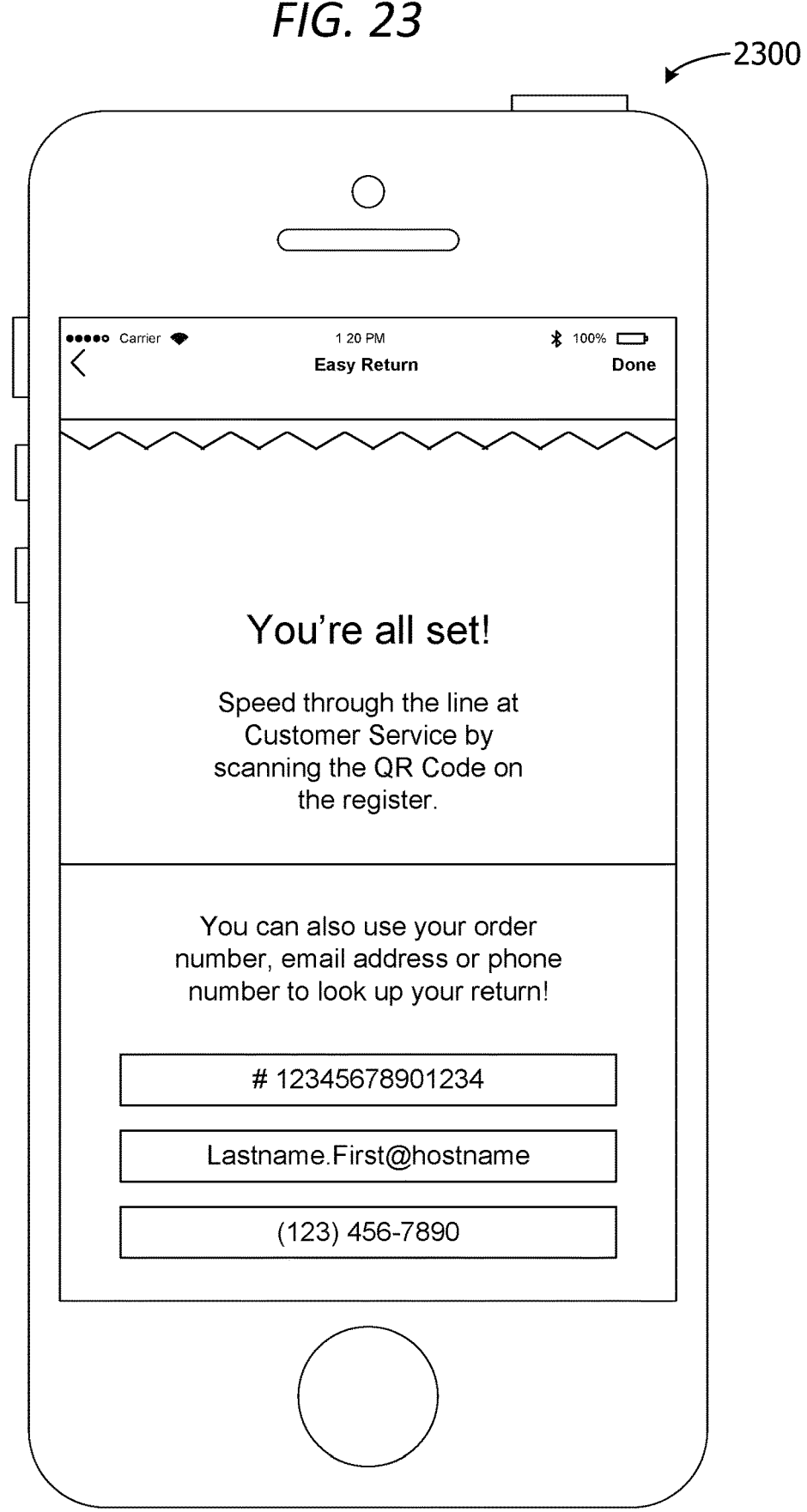
FIG. 23 is an exemplary block diagram illustrating a screenshot of a user device displaying an item return instruction.

FIG. 23 is an exemplary block diagram illustrating a screenshot 2300 of a user device displaying item return instructions. The instructions notification include an instruction to deliver the item to an item return location and scan a QR code associated with a designated return location, such as, but not limited to, a service area.

Figure 24:
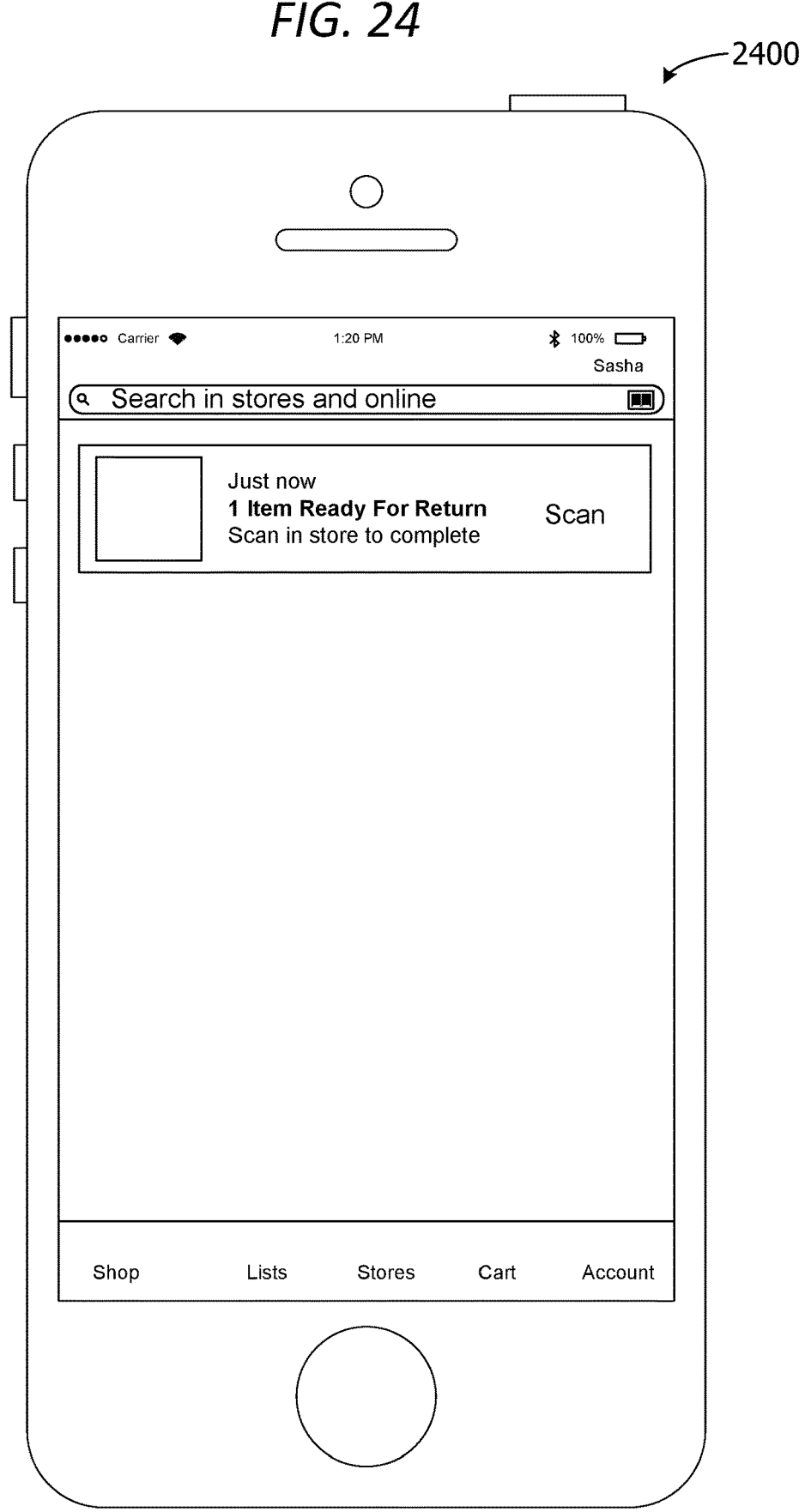
FIG. 24 is an exemplary block diagram illustrating a screenshot of a user device displaying an instruction to scan the quick response (QR) code and scan the item at the item return location.

FIG. 24 is an exemplary block diagram illustrating a screenshot 2400 of a user device displaying an instruction to scan the QR code and scan the item at the item return location.

Figure 25:
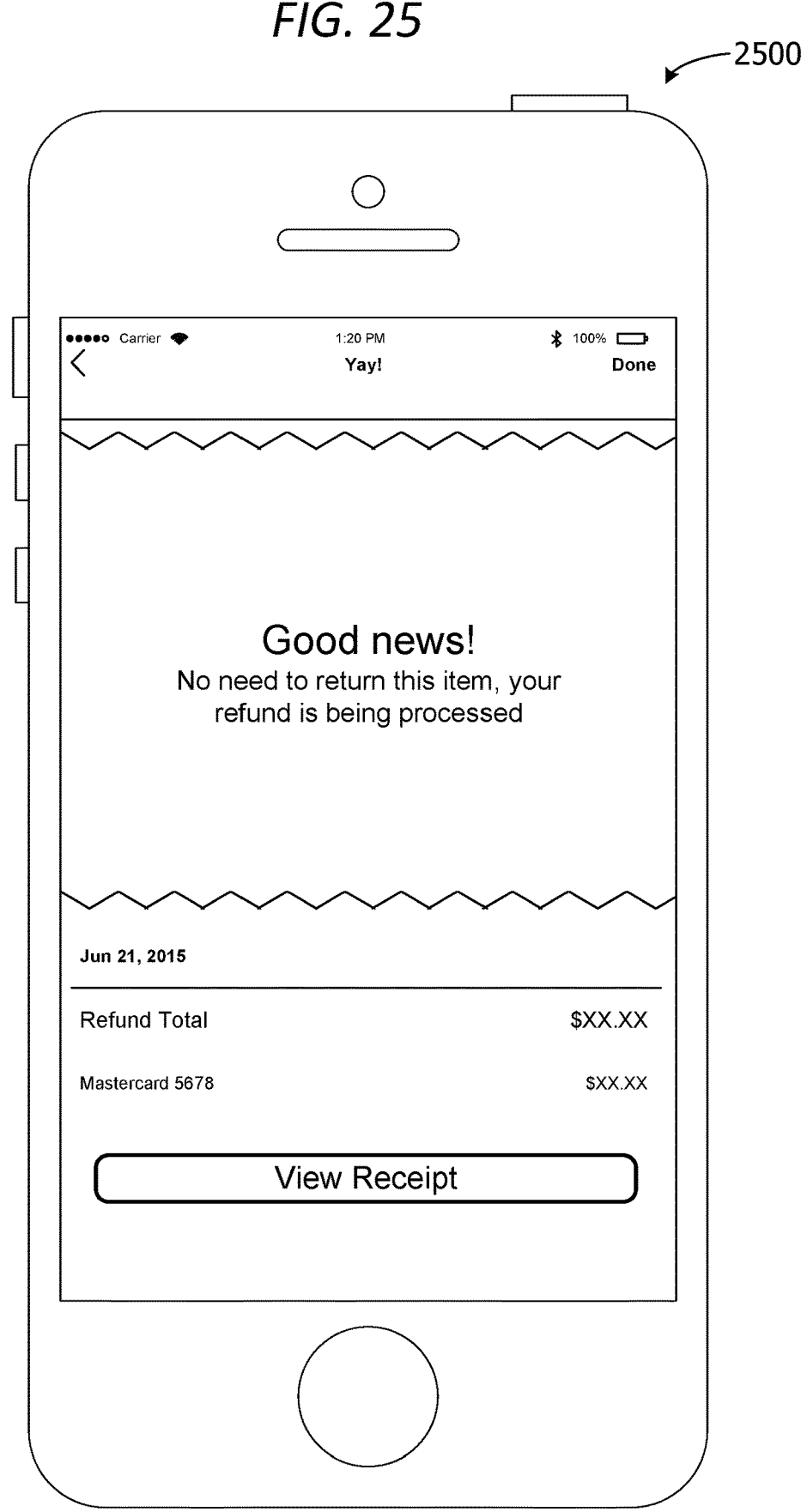
FIG. 25 is an exemplary block diagram illustrating a screenshot of a user device displaying a notification to the user that the return transaction is complete without physically returning the item to an item return location.

FIG. 25 is an exemplary block diagram illustrating a screenshot 2500 of a user device displaying a notification to the user that the return transaction is complete without physically returning the item to an item return location. In other words, the return is completed without taking the item to a store or returning the item by mail. The user receives the refund while maintaining possession of the item. This improves user satisfaction, reduces time consumed by the returns process, and avoids incurring item disposal or restocking costs.

The screenshots shown in FIG. 16, FIG. 17, FIG. 18, FIG. 19, FIG. 20, FIG. 21, FIG. 22, FIG. 23, FIG. 24, and FIG. 25 are non-limiting examples of user interfaces displaying data associated with a self-return of an item by a user via a self-returns application. In other examples, the user interface can include additional features not shown in FIG. 16, FIG. 17, FIG. 18, FIG. 19, FIG. 20, FIG. 21, FIG. 22, FIG. 23, FIG. 24, and FIG. 25 or exclude some of the features present in FIG. 16, FIG. 17, FIG. 18, FIG. 19, FIG. 20, FIG. 21, FIG. 22, FIG. 23, FIG. 24, and FIG. 25. Likewise, the user interface could include icons and other information in a different arrangement, orientation, and/or appearance than is shown in FIG. 16, FIG. 17, FIG. 18, FIG. 19, FIG. 20, FIG. 21, FIG. 22, FIG. 23, FIG. 24, and FIG. 25.

ADDITIONAL EXAMPLES

In some examples, the system authorizes a user to return an item remotely via a self-returns application on a user device. Implementing this "keep it" logic, including evaluating re-shelving costs and item disposition cost thresholds, enables users (customers) to immediately receive refunds on select "qualifying" items based on dollar thresholds, transaction history data, and risk models.

In an example scenario, the system allows a first user (customer) to make an item self-return by scanning and leaving the item to be returned at a designated location without associate (second user) intervention. The second user (returns manager/associate) can approach the first user entering a store with the item for return. The second user can use a mobile device to facilitate the returns process. The second user scans in the first user's receipt and/or scans the item to be returned. The system outputs instructions to the second user.

Depending upon a set of disposition rules, the system can indicate the first user can keep the item or continue to process the return and place the item in a bin "X". If the system authorizes completion of the return process, the second user can take the item and place it in the designated bin. The system applies credit to first users account if a credit card was used to complete the transaction. If the first user paid in cash, the second user can print out a return receipt and direct the first user to a self-check-out (SCO) for payment.

In another alternative example, the first user utilizes a mobile user device to process the self-return. The first user scans a receipt and the item to be returned. The system utilizes the item return data to determine the next step based upon a set of authorization rules and/or a set of item disposition rules. If the value of the item is low, or if the item is perishable, the first user can be permitted to keep the item. Instead of scanning a receipt, the user can provide a transaction code from the receipt, scan the item to return, and provide a reason for return. The authorization rules dictate that the return process be stopped/halted and transferred to a returns manager for completion in the store. For other product returns, the system can allow the first user to complete the return process and will instruct the first user to place the item in bin "X" at the store or print out a return shipping label to mail the item back to the store or other provider/seller of the item.

The user can initiate returns at the SCO by scanning the receipt or entering the transaction code from the bottom of the receipt. The user scans the item for return and enter a reason for return of the item. The authorization rules and disposition rules determine if the return is completed at the SCO or if another user is assigned to assist with completion of the returns process.

The self-returns application in another example allows a user to scan an item for return. The system determines whether it is worthwhile for the store to keep the returned item. If it is not worthwhile or there is an advantage in letting the user retain the item, the user is permitted to retain the item. The item disposition component considers factors such as attributes of the item to be returned (e.g., is it hazardous and are there safety concerns). The system evaluates the user's return history to determine if fraud is suspected. The system compares the cost of return and restocking the item with allowing the user to retain the item along with the impact of allowing the user to retain the item in this same or similar situations.

In another exemplary illustration, a user enters a store and utilizes a self-returns application on the user's mobile device or on a store's kiosk to retrieve transaction details from a cloud storage, retrieve a refund amount or the item, and automatically refund payment to user after the user returns the item to a designated bin or other receptacle. In these examples, the user returns an item at a different location than the location at which the item was originally purchased.

In some examples, the authorization rules include pre-approved items for self-returns. The pre-approved items can include low-value items, such as t-shirts. In other examples, a return of a t-shirt via a self-return is approved based on a combination of the return value of the item, including the dollar amount value of the item, and the return-trust score of the user.

In other examples, disposition criteria and item data are utilized to determine whether to allow a user to keep an item. In an example, the disposition criteria specifies that perishable items, such as baby formula, should be kept by the user requesting the return or disposed of if the item is returned to the store due to the perishable nature of the item preventing restocking.

In another example, factors utilized to determine whether to allow a user to complete a return via a self-return system and keep the item includes restocking costs of an item, return-trust score of the user, value of the item, type of the item, category of the item, whether the user has a returns account (user opt-in registration data available), whether the user returning the item is identified or unidentifiable, whether this is a user's first item return, previous purchases, credit score, payment method, etc. For example, if the user has no previous transaction history and used cash to complete a current transaction, the user assigns a lower return-trust score. Likewise, if the return is a user's first return transaction, the user return-trust score can be lower (below an acceptable threshold).

The rules can be customized to a selected store. For example, at a first store, there may be very few fraudulent returns of digital video disks (DVDs), however, at a second store there may be a much higher ratio of fraudulent DVD returns. Therefore, the per-item return value for a DVD item at the first store can be significantly higher than at the second store. This enables the system to authorize self-return of the DVD item at the first store but deny self-return for the same item at the second store. In this manner, the system enables real-time item return authorizations and item disposition determinations customized on a per-store, per-user and per-item (store-user-item) level.

The system allows for an omnichannel (both in-store and online/marketplace purchased) item returns. The system includes a self-returns application that works with a store's geo-fence. When the self-returns application on the mobile device detects the geo-fence, the application reminds the user of pending returns which have been preprocessed and ready for finalizing.

Two independent third-party sources of information are utilized by the system to verify the returns account owner's identity to build a trust model for the user in another example. The first source is a similar financial credit/services data provider, such as EXPERIAN®. The second is a provider which tracks personal email accounts to popular sites, such as social media. The user signs up for a returns account and provides an email account. The system utilizes third party data to verify that the user-provided name and email combination have been used for a predetermined time-period by this person, such as, but not limited to, a four-year time-period. This provides another level of verifying/authorizing self-returns.

The system can permit a user to initiate an item return before arriving at the store in another example. The self-returns application allows the user to scan the UPC or other marker on the item and retrieves the receipt for that item. Then once the user enters the store with the item, the user scans a QR code displayed on a self-service kiosk in the customer service area with their mobile device. This enables the kiosk to retrieve prepared return transaction data for the user to the kiosk. Once connected, the system completes the item return process without intervention of an associate/returns manager. The system instructs the user to place the item in a bin or keep the item in accordance with disposition rules. Rules determine when the user's account receives a refund for the return transaction. For example, the user's account can receive the refund when the self-return is approved, when the item is received at the designated return location, after the item is inspected, etc.

Alternatively, or in addition to the other examples described herein, examples include any combination of the following:

- a notification component, implemented on the at least one processor, that outputs a notification to a user device associated with a second user, the notification assigning the second user to assist the first user with completing a return of the selected item on condition the return authorization component fails to authorize the unassisted self-return of the selected item;
- the calculation component, implemented on the at least one processor, that calculates the per-item return value for the selected item based on a set of item attributes and a set of item-value parameters;
- the set of item-value parameters comprising at least one of a maximum threshold value of the selected item, a threshold number of instances of a returned item per time-period, a threshold number of item returns in a single transaction, a set of self-return ineligible categories, a set of self-return ineligible items;
- wherein the set of item attributes comprises at least one of a category of the selected item, a value of the selected item, an item returns history associated with the selected item, the number of instances of the selected item returned within a predetermined time-period, the number of valid returns of instances of the selected item within a predetermined time-period, or the number of invalid attempted returns of instances of the selected item within the predetermined time-period;
- a notification component, implemented on the at least one processor, that outputs a disposition notification to a user device associated with a second user to restock the selected item on condition the selected item is received from the user at the designated return location and an estimated cost of restocking the selected item is below a maximum threshold value for the item;
- a notification component, implemented on the at least one processor, that outputs a disposition notification to a user device associated with a second user to return the selected item to a supplier associated with the selected item on condition the selected item is received by at least one user associated with the designated return location and the selected item is designated as an item to be returned to the supplier;
- a notification component, implemented on the at least one processor, that outputs a disposition notification to a user device associated with a second user to dispose of the selected item on condition of return the selected item to the designated return location and the selected item is a perishable item associated with a cold-chain compliance requirement;
- wherein the transaction history data comprises at least one of a method of payment utilized to complete previous transactions, a credit score associated with the selected user, an identification of any issues associated with previously returned items or user provided data associated with a returns account of the selected user;
- wherein the transaction history data comprises at least one of the number of items returned by the selected user within a predetermined time-period, the number of items obtained by the selected user within the predetermine time-period, an identification of items previously returned, or a value of each item previously returned;
- a communications interface component, implemented on the at least one processor, that retrieves the transaction history data from a cloud storage via a network;

analyzing, by a calculation component, the item return data associated with the selected item and transaction history data associated with the first user, including a ratio of item purchases to item returns by the selected user, using a set of score generation rules;

calculating, by the calculation component, an updated per-user return-trust score for the first user based on results of the analysis of the item return data and the transaction history data;

storing the updated per-user return-trust score within a returns account associated with the first user;

outputting instructions to a second user device associated with the second user to dispose of the selected item on condition of return the selected item to the designated return location and identification of the selected item as a perishable item;

outputting instructions a second user device associated with the second user to restock the selected item on condition the selected item is received at the designated return location and an estimated cost of restocking the selected item is below a maximum threshold;

outputting instructions to a second user device associated with the second user to return the selected item to a supplier associated with the selected item on condition the selected item is returned to the designated return location and the selected item is designated as an item to be returned to the supplier;

calculating the per-item return value for the selected item based on a set of item attributes and a set of item-value parameters, the set of item-value parameters comprising at least one of a maximum threshold value of the selected item, a threshold number of instances of a returned item per time-period, a threshold number of item returns in a single transaction, a set of self-return ineligible categories, a set of self-return ineligible items;

calculating the per-user return-trust score for the first user based on number of items returned by the selected user within a predetermined time-period, the number of items obtained by the selected user within the predetermine time-period, an identification of items previously returned, or a value of each item previously returned;

the calculation component, implemented on the at least one processor, that calculates the per-item return value for the set of items based on a set of item attributes and a set of item-value parameters;

the set of item-value parameters comprising at least one of a maximum threshold value of the selected item, a threshold number of instances of a returned item per time-period, a threshold number of item returns in a single transaction, a set of self-return ineligible categories, a set of self-return ineligible items;

the calculation component, implemented on the at least one processor, that analyzes the item return data associated with the set of items and transaction history data associated with the identified user, including a ratio of item purchases to item returns by the selected user, using a set of score generation rules;

calculates an updated per-user return-trust score for the first user based on results of the analysis of the item return data and the transaction history data; and stores the updated per-user return-trust score within a returns account associated with the first user.

At least a portion of the functionality of the various elements in FIG. 1, FIG. 2, FIG. 3, FIG. 4, FIG. 5, FIG. 6, and FIG. 7 can be performed by other elements in FIG. 1, FIG. 2, FIG. 3, FIG. 4, FIG. 5, FIG. 6, and FIG. 7, or an entity (e.g., processor 106, web service, server, application program, computing device, etc.) not shown in FIG. 1, FIG. 2, FIG. 3, FIG. 4, FIG. 5, FIG. 6, and FIG. 7.

In some examples, the operations illustrated in FIG. 10, FIG. 11 FIG. 12, FIG. 13, FIG. 14 and FIG. 15 can be implemented as software instructions encoded on a computer readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice is be provided to the users of the collection of the data (e.g., via a dialog box or preference setting) and users are given the opportunity to give or deny consent for the monitoring and/or collection. The consent can take the form of opt-in consent or opt-out consent.

EXEMPLARY OPERATING ENVIRONMENT

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for customized item self-return. For example, the elements illustrated in FIG. 1, FIG. 2, FIG. 3, FIG. 4, FIG. 5, FIG. 6, and FIG. 7, such as when encoded to perform the operations illustrated in FIG. 10, FIG. 11, FIG. 12, FIG. 13, FIG. 14 and FIG. 15, constitute exemplary means for receiving item return data associated with a proposed return of a selected item from a user device associated with a first user; exemplary means for assigning a second user to assist the first user with completion of the proposed return of the selected item on condition a per-user return-trust score associated with the user is within an unacceptable return-trust score threshold range or a per-item return value associated with the selected item is within an unacceptable return value threshold range; exemplary means for authorizing unassisted self-return of the selected item by the first user on condition the per-user return-trust score associated with the selected user is within an acceptable return-trust score threshold range and the per-item return value associated with the selected item is within an acceptable return value threshold range; exemplary means for selecting a disposition of the selected item on condition the unassisted self-return of the selected item by the first user is authorized based on an analysis of the item return data, transaction history data associated with the first user, and item data using a set of item disposition criteria; exemplary means for approving completion of proposed return without return of the selected item to the designated return location on condition the selected disposition comprises retaining the selected item by the selected user; and exemplary means for outputting instructions to place the selected item in a designated receptacle associated with the designated return location via a user interface component associated with the user device on condition the selected disposition comprises returning the selected item.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system enabling item returns, the system comprising:
   at least one processor;
   a memory communicatively coupled with the at least one processor;
   a calculation component, implemented on the at least one processor, configured to access a returns account associated with a selected user attempting to return a selected item, calculate a per-user return-trust score for the selected user, and automatically calculate a per-item return value of the selected item as a function of a ratio of purchases to returns of the selected item by a plurality of users within a predetermined time-period;
   a return authorization component, implemented on the at least one processor, configured to analyze the per-user return-trust score and item data associated with the selected item, including a value of the selected item and the per-item return value, and determine whether to authorize unassisted self-return of the selected item by the selected user based on results of the analysis;
   an item disposition component, implemented on the at least one processor, configured to generate a set of item disposition instructions associated with the selected item in real-time based on a set of item disposition criteria and a set of item return data, wherein the set of item disposition instructions comprising at least one of a first instruction to leave the selected item at a designated return location or a second instruction to retain the selected item by the selected user; and an application configured to be executed on a first user device, wherein the first user device comprises a mobile device, and wherein the application when executed on the first user device is configured to:
detect a geo-fence active relative to a store that includes the designated return location; and
generate a reminder to the selected user of a pending return of the selected item in response to receiving the set of item disposition instructions and detecting the geo-fence;

wherein the calculation component is further configured to, in response to an actual return of the selected item or failure to return the selected item, update in real-time the per-user return-trust score of the selected user based on the return or failure to return, and store the updated per-user return-trust score in the returns account associated with the selected user.

2. The system of claim 1, further comprising:
a notification component configured to identify and output one of multiple different notifications based on the determination of whether to authorize the unassisted self-return of the selected item by the selected user, the multiple different notifications comprising:
a first notification to a second user device associated with a second user assigning the second user to assist the selected user with completing a return of the selected item when the return authorization component does not authorize the unassisted self-return of the selected item; and
a second notification to the second user device comprising a restock instruction associated with the selected item.

3. The system of claim 1, wherein the calculation component is configured to calculate the per-item return value for the selected item based on a set of item attributes and a set of item-value parameters, wherein the set of item-value parameters comprising at least one of a threshold value of the selected item, a threshold number of instances of a returned item per time-period, a threshold number of item returns in a single transaction, a set of self-return ineligible categories, and a set of self-return ineligible items.

4. The system of claim 1, wherein the calculation component is configured to calculate the per-item return value for the selected item based on a set of item attributes and a set of item-value parameters, wherein the set of item attributes comprises at least one of a category of the selected item, the value of the selected item, and an item returns history associated with the selected item, wherein the item returns history corresponding to the selected item comprises at least one of a number of instances of the selected item returned within a first time-period, a number of valid returns of instances of the selected item within a second time-period, and a number of invalid attempted returns of instances of the selected item within a third time-period.

5. The system of claim 1, further comprising:
a notification component configured to output a disposition notification to a second user device associated with a second user based on the selected item being returned to the designated return location and an estimated cost of restocking the selected item being below a restocking threshold, the disposition notification comprising a restock instruction associated with the selected item.

6. The system of claim 1, further comprising:
a notification component configured to output a disposition notification to a second user device associated with a second user to send the selected item to a supplier associated with the selected item based on the selected item being received at the designated return location and the selected item being designated as an item to be returned to the supplier.

7. The system of claim 1, further comprising:
a notification component configured to output a disposition notification to a second user device associated with a second user to dispose of the selected item based on the selected item being received at the designated return location and the selected item is a perishable item associated with a cold-chain compliance requirement.

8. The system of claim 1, wherein the calculation component is further configured to calculate the per-user return-trust score for the selected user based on an analysis of the item data associated with the selected item and transaction history data associated with the selected user, wherein the transaction history data comprises at least one of a method of payment utilized to complete previous transactions, a credit score associated with the selected user, an identification of one or more issues associated with previously returned items, and user provided data associated with the returns account of the selected user.

9. The system of claim 1, wherein calculation component is further configured to calculate the per-user return-trust score for the selected user based on an analysis of the item data associated with the selected item and transaction history data associated with the selected user, wherein the transaction history data comprises at least one of a number of items returned by the selected user within a second predetermined time-period, a number of items purchased by the selected user within the second predetermined time-period, an identification of items previously returned, and a value of each item previously returned.

10. The system of claim 1, further comprising:
a task assignment component configured to assign a second user to assist the selected user with completion of the proposed return of the selected item based on at least one of the return-trust score associated with the selected user being outside of a return-trust score threshold range or the per-item return value associated with the selected item being outside of a return value threshold range.

11. The system of claim 1, further comprising:
wherein the return authorization component is configured to authorize the unassisted self-return of the selected item by the selected user based on at least one of the per-user return-trust score associated with the selected user being within a return-trust score threshold range and the per-item return value associated with the selected item being within a return value threshold range.

12. The system of claim 1, further comprising:
a returns management component configured to approve completion of a proposed return without delivery of the selected item to the designated return location based on the second instruction to retain the selected item by the selected user.

13. A method to enable item returns comprising:
accessing, by at least one processor, a returns account associated with a selected user attempting to return a selected item;
calculating, by the at least one processor, a per-user return-trust score for the selected user, and calculating a per-item return value of the selected item as a function of a ratio of purchases to returns of the selected item by a plurality of users within a predetermined time-period;

analyzing the per-user return-trust score and item data associated with the selected item, including a value of the selected item and the per-item return value, and determining whether to authorize unassisted self-return of the selected item by the selected user based on results of the analysis;

generating a set of item disposition instructions associated with the selected item in real-time based on a set of item disposition criteria and a set of item return data, wherein the set of item disposition instructions comprising at least one of a first instruction to leave the selected item at a designated return location or a second instruction to retain the selected item by the selected user;

detecting, by an application executed on a first user mobile device, a geo-fence activate relative to a store that includes the designated return location;

generating, by the application executed on the first user mobile device, a reminder to the selected user of a pending return of the selected item in response to receiving the set of item disposition instructions and detecting the geo-fence; and updating in real-time the per-user return-trust score of the selected user, in response to an actual return of the selected item or failure to return the selected item, based on the return or failure to return and store the updated per-user return-trust score in the returns account associated with the selected user.

14. The method of claim 13, further comprising:
outputting one of multiple different notifications based on the determination of whether to authorize the unassisted self-return of the selected item by the selected user, to a second user device associated with a second user, comprising:
outputting a first notification assigning the second user to assist the selected user with completing a return of the selected item when determined not to authorize the unassisted self-return of the selected item; and
outputting a second notification to the second user device comprising a restock instruction associated with the selected item.

15. The method of claim 13, wherein the calculating the per-item return value for the selected item comprises calculating the per-item return value based on a set of item attributes and a set of item-value parameters, wherein the set of item-value parameters comprising at least one of a threshold value of the selected item, a threshold number of instances of a returned item per time-period, a threshold number of item returns in a single transaction, a set of self-return ineligible categories, and a set of self-return ineligible items.

16. The method of claim 13, wherein the calculating the per-item return value for the selected item comprises calculating the per-item return value based on a set of item attributes and a set of item-value parameters, wherein the set of item attributes comprises at least one of a category of the selected item, the value of the selected item, and an item returns history associated with the selected item, wherein the item returns history corresponding to the selected item comprises at least one of a number of instances of the selected item returned within a first time-period, a number of valid returns of instances of the selected item within a second time-period, and a number of invalid attempted returns of instances of the selected item within a third time-period.

17. The method of claim 13, further comprising:
outputting a disposition notification to a second user device associated with a second user based on the selected item being returned to the designated return location and an estimated cost of restocking the selected item is below a restocking threshold, the disposition notification comprising a restock instruction associated with the selected item.

18. The method of claim 13, further comprising:
outputting a disposition notification to a second user device associated with a second user to send the selected item to a supplier associated with the selected item based on the selected item being received at the designated return location and the selected item being designated as an item to be returned to the supplier.

19. The method of claim 13, wherein the calculating the per-user return-trust score for the selected user comprises calculating the per-user return-trust score for the selected user based on an analysis of the item data associated with the selected item and transaction history data associated with the selected user, wherein the transaction history data comprises at least one of a method of payment utilized to complete previous transactions, a credit score associated with the selected user, an identification of one or more issues associated with previously returned items, and user provided data associated with the returns account of the selected user.

20. The method of claim 13, wherein the calculating the per-user return-trust score for the selected user comprises calculating the per-user return-trust score for the selected user based on an analysis of the item data associated with the selected item and transaction history data associated with the selected user, wherein the transaction history data comprises at least one of a number of items returned by the selected user within a second predetermined time-period, a number of items purchased by the selected user within the second predetermined time-period, an identification of items previously returned, and a value of each item previously returned.

* * * * *